United States Patent
Chen et al.

(10) Patent No.: US 10,742,292 B2
(45) Date of Patent: Aug. 11, 2020

(54) CSI FEEDBACK METHOD, PRECODING METHOD, AND APPARATUS

(71) Applicant: China Academy of Telecommunications Technology, Beijing (CN)

(72) Inventors: Wenhong Chen, Beijing (CN); Qiubin Gao, Beijing (CN); Hui Li, Beijing (CN); Runhua Chen, Beijing (CN); Tamrakar Rakesh, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 57 days.

(21) Appl. No.: 16/084,218

(22) PCT Filed: Feb. 24, 2017

(86) PCT No.: PCT/CN2017/074810
§ 371 (c)(1),
(2) Date: Sep. 11, 2018

(87) PCT Pub. No.: WO2017/152785
PCT Pub. Date: Sep. 14, 2017

(65) Prior Publication Data
US 2019/0074884 A1    Mar. 7, 2019

(30) Foreign Application Priority Data
Mar. 11, 2016  (CN) .......................... 2016 1 0141891

(51) Int. Cl.
*H04W 4/00*      (2018.01)
*H04B 7/06*      (2006.01)
(Continued)

(52) U.S. Cl.
CPC ......... *H04B 7/0626* (2013.01); *H04B 7/0456* (2013.01); *H04B 7/0478* (2013.01);
(Continued)

(58) Field of Classification Search
CPC .. H04B 7/0626; H04B 7/0456; H04B 7/0632; H04B 7/0639; H04W 72/04;
(Continued)

(56) References Cited

U.S. PATENT DOCUMENTS 9,794,818 B2 * 10/2017 Zhou ..................... H04L 1/0026
2012/0076028 A1 * 3/2012 Ko .......................... H04L 1/0026
                                                              370/252
(Continued)

FOREIGN PATENT DOCUMENTS

CN          101296207 A       10/2008
CN          103181097 A        6/2013
(Continued)

OTHER PUBLICATIONS

3GPP; Technical Specification Group Radio Access Network; Evolved Universal Terrestrial Radio Access (E-UTRA); 3GPP TS 36.213 V13.0.1; Jan. 2016.
(Continued)

*Primary Examiner* — Stephen M D Agosta
(74) *Attorney, Agent, or Firm* — Kilpatrick Townsend & Stockton LLP

(57) ABSTRACT

Disclosed are a channel state information (CSI) feedback method, a precoding method, and an apparatus. In the present invention, a terminal obtains, according to the number of downlink transport layers, a first precoding matrix set that is located on a first subband and that is corresponding to the number of the downlink transport layers, the first precoding matrix set comprising one or more precoding matrices, and a physical resource in the first subband being
(Continued)

corresponding to a precoding matrix in the first precoding matrix set; the terminal determines a channel quality indicator (CQI) on a second subband according to downlink channel information and the first precoding matrix set on the first subband; and the terminal feeds back the CSI, the CSI comprising one or more of the following information: an RI used for indicating the number of the downlink transport layers, a PMI used for indicating the first precoding matrix set on the first subband and the CQI on the second subband. The technical solution disclosed in the resent invention can reduce signaling overheads of feeding back CSI by a terminal.

20 Claims, 3 Drawing Sheets

(51) Int. Cl.
H04B 7/0456 (2017.01)
H04W 72/04 (2009.01)
(52) U.S. Cl.
CPC ......... H04B 7/0486 (2013.01); H04B 7/0632 (2013.01); H04B 7/0639 (2013.01); H04W 72/04 (2013.01)
(58) Field of Classification Search
CPC .............. H04W 72/042; H04W 24/10; H04W 72/0413; H04W 24/08; H04L 5/0048; H04L 5/0053; H04L 5/0057; H04L 5/001; H04L 1/0026; H04L 5/0094; H04L 1/1812
See application file for complete search history.

(56) References Cited

U.S. PATENT DOCUMENTS

| | | | | |
|---|---|---|---|---|
| 2012/0257524 | A1* | 10/2012 | Chen | H04L 5/001 370/252 |
| 2013/0107861 | A1* | 5/2013 | Cheng | H04W 72/042 370/331 |
| 2013/0182789 | A1 | 7/2013 | Ko et al. | |
| 2013/0301560 | A1* | 11/2013 | Geirhofer | H04B 7/0621 370/329 |
| 2014/0036796 | A1* | 2/2014 | Eternad | H04W 76/10 370/329 |
| 2014/0064109 | A1* | 3/2014 | Krishnamurthy | H04J 11/0053 370/252 |
| 2014/0133474 | A1* | 5/2014 | Damnjanovic | H04W 52/30 370/336 |
| 2014/0204857 | A1* | 7/2014 | Mallik | H04L 1/0009 370/329 |
| 2014/0301232 | A1* | 10/2014 | Rao | H04W 24/02 370/252 |
| 2016/0211903 | A1* | 7/2016 | Damnjanovic | H04B 7/0626 |

FOREIGN PATENT DOCUMENTS

| | | |
|---|---|---|
| CN | 104243003 A | 12/2014 |
| CN | 104365137 A | 2/2015 |
| CN | 104380629 A | 2/2015 |
| CN | 104579586 A | 4/2015 |
| EP | 2955869 A1 | 12/2015 |
| JP | 2010518726 A | 5/2010 |
| KR | 20110109992 A | 10/2011 |
| KR | 20150008473 A | 1/2015 |
| WO | 2014176813 A1 | 11/2014 |
| WO | 2014178615 A1 | 11/2014 |
| WO | 2015143605 A1 | 10/2015 |
| WO | 2015156578 A1 | 10/2015 |

OTHER PUBLICATIONS

Samsung: "Rank 1-2 codebook for Class A CSI reporting", 3GPP Draft; R1-156121 Rank 1-2 Codebook for Class A CSI Reporting Final—R1, 3rd Generation Partnership Project (3GPP), Mobile Competence Centre, on Oct. 7, 2015, 14 Pages.

* cited by examiner

CSI FEEDBACK METHOD, PRECODING METHOD, AND APPARATUS

This application is a US National Stage of International Application No. PCT/CN2017/074810, filed on Feb. 24, 2017, designating the United States and claiming the benefit of Chinese Patent Application No. 201610141891.1, filed with the Chinese Patent Office on Mar. 11, 2016, and entitled "A method and apparatus for providing feedback of CSI, and a pre-coding method and apparatus". The entire disclosure of each of the applications above is incorporated herein by reference.

FIELD

The present disclosure relates to the field of communications, and particularly to a method and apparatus for providing feedback of CSI, and a pre-coding method and apparatus.

BACKGROUND

Mobility and wideband have become a development trend of modern communication technologies. The $3^{rd}$ Generation Partnership Project (3GPP) has been devoted to long Term Evolution (LTE) system evolving from a 3G system with the aim of developing the 3GPP radio access technologies toward a high data ratio, a short delay, and optimized packet data applications. The Multi-input Multi-Output (MIMO) technology at the physical layer has become one of crucial technologies in the current mobile communication system due to a number of advantages thereof, for example, the capacity of the system is extended through space division multiplexing of multiple antennas, the throughput of the system is improved using a multiplexing gain of multiple antennas, and etc.

After a base station obtains some Channel State Information (CSI) (which can be an instantaneous value, or can be short-term or middle-to-long-term statistic information), it can optimize power, rates, and even transmitting directions applied to respective data streams in some preprocessing scheme, and possibly a part or all of interference between the data streams may be eliminated in advance at a terminal through preprocessing, thus achieving higher performance. However there is such a significant overhead of downlink MIMO feedback at present that no corresponding gain in performance can be achieved particularly in transmission at a high rank (i.e., the number of downlink transmission layers). Furthermore the performance of the existing codebook design is greatly degraded in the scenario of mobility at a high speed, so the efficiency of transmission cannot be guaranteed.

Accordingly it is highly desirable in the industry to lower signaling overhead of the terminal providing feedback of CSI.

SUMMARY

Embodiments of the disclosure provide a method and apparatus for providing feedback of CSI, and a pre-coding method and apparatus, so as to lower signaling overhead of a terminal providing feedback of CSI.

An embodiment of the disclosure provides a method for providing feedback of CSI. The method includes: obtaining, by a terminal, a first pre-coding matrix set in a first sub-band corresponding to the number of downlink transmission layers according to the number of downlink transmission layers, where the first pre-coding matrix set includes one or more first pre-coding matrices and each physical resource in the first sub-band corresponds to one of the one or more first pre-coding matrices in the first pre-coding matrix set; determining, by the terminal, a Channel Quality Indicator (CQI) in a second sub-hand according to downlink channel information and according to the first pre-coding matrix set in the first sub-band; and providing, by the terminal, feedback of the CSI, where the CSI includes one or more of: an rank indicator (RI) indicating the number of downlink transmission layers, indication information of the first pre-coding matrix set in the first sub-band, and the CQI in the second sub-band.

In an implementation, the first pre-coding matrix set is obtained according to one or more vector groups in a preset vector group set, and according to one or more phase factors in a preset phase set.

In an implementation, the vector group set includes one or more vector groups, and one first pre-coding matrix set is obtained based upon one of the one or more vector groups in the preset vector group set; and/or, the preset phase set includes one or more phase factors, and each of the one or more first pre-coding matrices in the first pre-coding matrix set is obtained based upon one of the one or more phase factors in the preset phase set.

In an implementation, obtaining the first pre-coding matrix set according to one or more vector groups in the preset vector group set and according to one or more phase factors in the preset phase set includes: performing a Kronecker product operation on a phase matrix and one or more vectors in a vector group in the vector group set, where the phase matrix is obtained based upon a phase factor in the preset phase set; and, constituting one of the one or more first pre-coding matrices in the first pre-coding matrix set by using column vectors in a matrix obtained as a result of the Kronecker product operation.

In an implementation, the phase matrix is $$w_n = \begin{bmatrix} 1 & 1 \\ \varphi_n & -\varphi_n \end{bmatrix}, \text{ or } w_n = \begin{bmatrix} 1 \\ \varphi_n \end{bmatrix}, \text{ or } w_n = \begin{bmatrix} 1 \\ -\varphi_n \end{bmatrix}.$$

In an implementation, the phase set is $\{\varphi_n = e^{jn\pi/2}\}$ or $\{\varphi_n = e^{jn\pi}\}$, where n is an integer, $0 \leq n < N$, and N is the number of one or more phase factors in the phase set.

In an implementation, if multiple first pre-coding matrix sets in the first sub-band corresponding to the number of downlink transmission layers are obtained, then the method further includes: selecting one of the multiple first pre-coding matrix sets as per a preset criterion.

In an implementation, the indication information of the first pre-coding matrix set in the first sub-band includes a first Pre-coding Matrix Indicator (PMI), where the first PMI is an index of a first vector group in the preset vector group set, and the first pre-coding matrix set is obtained based upon the first vector group; or, the indication information of the first pre-coding matrix set in the first sub-band includes a first PMI and a second PMI, where the first PMI is an index of a vector group subset in the preset vector group set, the second PMI is an index of the first vector group in the vector group subset indicated by the first PME, and the first pre-coding matrix set is obtained based upon the first vector group.

In an implementation, the indication information of the first pre-coding matrix set in the first sub-band includes a first PMI, where the first PMI is an index of the first pre-coding matrix set in a first codebook, and the first codebook includes multiple first pre-coding matrix sets obtained according to the vector group set and according to the phase set; or the indication information of the first pre-coding matrix set in the first sub-band includes a first PMI and a second PMI. Where the first PMI is an index of a fourth pre-coding matrix set in a first codebook, the second PMI is an index of the first pre-coding matrix set in the fourth pre-coding matrix set, the first codebook includes multiple first pre-coding matrix sets obtained according to the vector group set and according to the phase set, and the fourth pre-coding matrix set includes one or more first pre-coding matrix sets, and is a subset of the first codebook.

In an implementation, the first pre-coding matrix set is obtained according to a second pre-coding matrix and according to a preset third pre-coding matrix set. Each of the one or more first pre-coding matrices in the first pre-coding matrix set is obtained as a result of calculation operation based on both the second pre-coding matrix and a third pre-coding matrix in the third pre-coding matrix set.

In an implementation, the second pre-coding matrix consists of one vector in a vector group in a preset vector group set; or, the second pre-coding matrix consists of a plurality of vectors in a vector group in the preset vector group set; or, the second pre-coding matrix consists of a vector of zeros and one or more vectors in a vector group in the preset vector group set, where all elements of the vector of zeros are zero.

In an implementation, the calculation operation is a matrix multiplication operation or a matrix Kronecker product operation.

In an implementation, obtaining the first pre-coding matrix set according to the second pre-coding matrix and the third pre-coding matrix set includes: obtaining Q first pre-coding matrix sets as a result of calculation based on both Q second pre-coding matrices in a second pre-coding matrix set and the third pre-coding matrix set, where each first pre-coding matrix set is obtained as a result of calculation operation based on both one of the Q second pre-coding matrices and the third pre-coding matrix set; and selecting one of the Q first pre-coding matrix sets as per a preset criterion, where Q is an integer more than or equal to 1. Or, obtaining the first pre-coding matrix set according to the second pre-coding matrix and the third pre-coding matrix set includes: selecting the second pre-coding matrix from a second pre-coding matrix set as per a preset criterion, and obtaining the first pre-coding matrix set as a result of calculation operation based on both the selected second pre-coding matrix and the third pre-coding matrix set.

In an implementation, the indication information of the first pre-coding matrix set in the first sub-band includes a first PMI, where the first PMI is an index of the second pre-coding matrix in a second pre-coding matrix set, and the first pre-coding matrix set is obtained based upon the second pre-coding matrix. Or, the indication information of the first pre-coding matrix set in the first sub-band includes a first PMI and a second PMI, where the first PMI is an index of a second pre-coding matrix subset in the second pre-coding matrix set, the second PMI is an index of the second pre-coding matrix in the second pre-coding matrix subset indicated by the first PMI, and the first pre-coding matrix set is obtained based upon the second pre-coding matrix.

In an implementation, the indication information of the first pre-coding matrix set in the first sub-band includes a first PMI, where the first PMI is an index of the first pre-coding matrix set in a first codebook, the first codebook includes multiple first pre-coding matrix sets obtained according to a second pre-coding matrix set and according to the third pre-coding matrix set, and each of the multiple first pre-coding matrix sets is obtained according to a second pre-coding matrix in the second pre-coding matrix set and according to the third pre-coding matrix set. Or, the indication information of the first pre-coding matrix set in the first sub-band includes a first PMI and a second PMI, where the first PMI is an index of a fourth pre-coding matrix set in the first codebook, the second PMI is an index of the first pre-coding matrix set in the fourth pre-coding matrix set, the first codebook includes multiple first pre-coding matrix sets obtained according to the second pre-coding matrix set and according to the third pre-coding matrix set, and the fourth pre-coding matrix set includes one or more first pre-coding matrix sets, and is a subset of the first codebook.

In an implementation, determining, by the terminal, the CQI in the second sub-band according to the downlink channel information and according to the first pre-coding matrix set in the first sub-band includes: determining, by the terminal, one or more second pre-coding matrices corresponding to one or more physical resources in the second sub-band according to the one or more first pre-coding matrices in the first pre-coding matrix set corresponding to the one or more physical resources in the first sub-band; and determining, by the terminal, the CQI in the second sub-band according to the one or more second pre-coding matrices corresponding to the one or more physical resources in the second sub-band.

In an implementation, after obtaining, by the terminal, the first pre-coding matrix set in the first sub-hand corresponding to the number of downlink transmission layers according to the number of downlink transmission layers, the method includes for each of the one or more first pre-coding matrices in the first pre-coding matrix set, arranging column vectors in the first pre-coding matrix according to a column vector arrangement pattern corresponding to the first pre-coding matrix, to obtain a fifth pre-coding matrix set in the first sub-band; and determining, by the terminal, the CQI in the second sub-band includes: determining the CQI in the second sub-band according to the downlink channel information and according to the fifth pre-coding matrix set in the first sub-band.

In an implementation, the number of columns in each of the one or more first pre-coding matrices in the first pre-coding matrix set in the first sub-band is the same as the number of downlink transmission layers.

In an implementation, the first sub-band includes one or more Physical Resource Blocks (PRBs); or, the second sub-band is the same as the first sub-band; or, the second sub-band includes a plurality of first sub-bands.

In an implementation, an i-th physical resource in the first sub-band corresponds to a k-th first pre-coding matrix in the first pre-coding matrix set, where k=i mod K, i=0, 1, 2 . . . N, k=0, 1, 2, 3, . . . , K−1, K is the number of first pre-coding matrices in the first pre-coding matrix set, and N is the number of physical resources in the first sub-band; or, k=ceil(i/v) mod K, where ceil(i/v) represents a minimum integer no less than i/v, v=RI, or v is the number of antenna ports, i=0, 1, 2 . . . N, k=0, 1, 2, 3, . . . , K−1, K is the number of first pre-coding matrices in the first pre-coding matrix set, and N is the number of physical resources in the first sub-band.

An embodiment of the disclosure provides a terminal. The terminal includes: a memory storing instructions, and a processor configured to execute the instructions to: obtain a first pre-coding matrix set in a first sub-band corresponding to the number of downlink transmission layers according to the number of downlink transmission layers, where the first pre-coding matrix set includes one or more first pre-coding matrices and each physical resource in the first sub-band corresponds to one of the one or more first pre-coding matrices in the first pre-coding matrix set; determine a CQI in a second sub-band according to downlink channel information and according to the first pre-coding matrix set in the first sub-band; and provide feedback of the CSI, where the CSI includes one or more of: an RI indicating the number of downlink transmission layers, indication information of the first pre-coding matrix set in the first sub-band, and the CQI in the second sub-band.

In an implementation, the first pre-coding matrix set is obtained according to one or more vector groups in a preset vector group set and according to one or more phase factors in a preset phase set.

In an implementation, the indication information of the first pre-coding matrix set in the first sub-band includes a first PMI, where the first PMI is an index of a first vector group in the preset vector group set, and the first pre-coding matrix set is obtained based upon the first vector group. Or, the indication information of the first pre-coding matrix set in the first sub-band includes a first PMI and a second PMI, where the first PMI is an index of a vector group subset in the preset vector group set, the second MI is an index of the first vector group in the vector group subset indicated by the first PMI, and the first pre-coding matrix set is obtained based upon the first vector group.

In an implementation, the indication information of the first pre-coding matrix set in the first sub-band includes a first PMI, where the first PMI is an index of the first pre-coding matrix set in a first codebook, and the first codebook includes multiple first pre-coding matrix sets obtained according to the vector group set and according to the phase set. Or, the indication information of the first pre-coding matrix set in the first sub-band includes a first PMI and a second PMI, where the first PMI is an index of a fourth pre-coding matrix set in a first codebook, the second PMI is an index of the first pre-coding matrix set in the fourth pre-coding matrix set, the first codebook includes multiple first pre-coding matrix sets obtained according to the vector group set and according to the phase set, and the fourth pre-coding matrix set includes one or more first pre-coding matrix sets, and is a subset of the first codebook.

In an implementation, the first pre-coding matrix set is obtained according to a second pre-coding matrix and according to a preset third pre-coding matrix set, where each of the one or more first pre-coding matrices in the first pre-coding matrix set is obtained as a result of calculation operation based on both the second pre-coding matrix and a third pre-coding matrix in the third pre-coding matrix set.

in an implementation, the indication information of the first pre-coding matrix set in the first sub-band includes a first PMI, Where the first PMI is an index of the second pre-coding matrix in a second pre-coding matrix set, and the first pre-coding matrix set is obtained based upon the second pre-coding matrix. Or, the indication information of the first pre-coding matrix set in the first sub-band includes a first PMI and a second PMI, where the first PME is an index of a second pre-coding matrix subset in the second pre-coding matrix set, the second PMI is an index of the second pre-coding matrix in the second pre-coding matrix subset indicated by the first PMI, and the first pre-coding matrix set is obtained based upon the second pre-coding matrix.

In an implementation, the indication information of the first pre-coding matrix set in the first sub-band includes a first PMI, where the first PMI is an index of the first pre-coding matrix set in a first codebook, the first codebook includes multiple first pre-coding matrix sets obtained according to a second pre-coding matrix set and according to the third pre-coding matrix set, and each of the multiple first pre-coding matrix sets is obtained according to a second pre-coding matrix in the second pre-coding matrix set and according to the third pre-coding matrix set. Or, the indication information of the first pre-coding matrix set in the first sub-band includes a first PMI and a second PMI, where the first PMI is an index of a fourth pre-coding matrix set in the first codebook, the second PMI is an index of the first pre-coding matrix set in the fourth pre-coding matrix set, the first codebook includes multiple first pre-coding matrix sets obtained according to the second pre-coding matrix set and according to the third pre-coding matrix set, and the fourth pre-coding matrix set includes one or more first pre-coding matrix sets, and is a subset of the first codebook.

In an implementation, the processor is further configured to execute the instructions to: determine one or more second pre-coding matrices corresponding to one or more physical resources in the second sub-band according to the one or more first pre-coding matrices in the first pre-coding matrix set corresponding to the one or more physical resources in the first sub-band; and determine the COI in the second sub-band according to the one or more second pre-coding matrices corresponding to the one or more physical resources in the second sub-band.

An embodiment of the disclosure provides a pre-coding method. The method includes: receiving, by a base station, feedback of CSI provided by a terminal, where the CSI includes indication information of a first pre-coding matrix set in a first sub-band; determining, by the base station, the first pre-coding matrix set in the first sub-band according to the indication information, where the first pre-coding matrix set includes one or more first pre-coding matrices, and each physical resource in the first sub-band corresponds to a first pre-coding matrix in the first pre-coding matrix set; and pre-coding, by the base station, data to be transmitted over a physical resource in the first sub-band using the first pre-coding matrix corresponding to the physical resource according to the first pre-coding matrix set.

In an implementation, determining, by the base station, the first pre-coding matrix set in the first sub-band according to the indication information includes: determining, by the base station, an index of a first vector group in a preset vector group set according to the indication information; and obtaining, by the base station, the first pre-coding matrix set in the first sub-band according to the first vector group and according to one or more phase factors in a phase set.

In an implementation, the indication information of the first pre-coding matrix set in the first sub-band includes a first PMI, where the first PMI is an index of the first vector group in the preset vector group set, and the first pre-coding matrix set is obtained based upon the first vector group. Or, the indication information of the first pre-coding matrix set in the first sub-band includes a first PMI and a second PMI, where the first PMI is an index of a vector group subset in the preset vector group set, the second PMI is an index of the first vector group in the vector group subset indicated by the first PMI, and the first pre-coding matrix set is obtained based upon the first vector group.

In an implementation, the indication information of the first pre-coding matrix set in the first sub-band includes a first PMI, where the first PMI is an index of the first pre-coding matrix set in a first codebook, and the first codebook includes multiple first pre-coding matrix sets obtained according to a preset vector group set and according to a preset phase set, and the base station determines the first pre-coding matrix set in the first sub-band according to the first PMI. Or, the indication information of the first pre-coding matrix set in the first sub-band includes a first PMI and a second PMI, where the first PMI is an index of a fourth pre-coding matrix set in the first codebook, the second PMI is an index of the first pre-coding matrix set in the fourth pre-coding matrix set, the first codebook includes multiple first pre-coding matrix sets obtained according to the preset vector group set and according to the preset phase set, and the fourth pre-coding matrix set includes one or more first pre-coding matrix sets, and is a subset of the first codebook, and the base station determines the first pre-coding matrix set in the first sub-band according to the first PMI and according to the second PMI.

In an implementation, determining, by the base station, the first pre-coding matrix set in the first sub-band according to the indication information includes: determining, by the base station, an index of a second pre-coding matrix in a second pre-coding matrix set according to the indication information; and obtaining, by the base station, the first pre-coding matrix set in the first sub-band according to the second pre-coding matrix and according to a preset third pre-coding matrix set, where each first pre-coding matrix in the first pre-coding matrix set is obtained as a result of calculation operation based on both the second pre-coding matrix and a third pre-coding matrix in the third pre-coding matrix set.

In an implementation, the indication information of the first pre-coding matrix set in the first sub-band includes a first PMI, where the first PMI is an index of the second pre-coding matrix in a second pre-coding matrix set, and the first pre-coding matrix set is obtained based upon the second pre-coding matrix. Or, the indication information of the first pre-coding matrix set in the first sub-band includes a first PMI and a second PIM, where the first PMI is an index of a second pre-coding matrix subset in a second pre-coding matrix set, the second PMI is an index of the second pre-coding matrix in the second pre-coding matrix subset indicated by the first PMI, and the first pre-coding matrix set is obtained based upon the second pre-coding matrix.

In an implementation, the indication information of the first pre-coding matrix set in the first sub-band includes a first PMI, the first PMI is an index of the first pre-coding matrix set in a first codebook, the first codebook includes multiple first pre-coding matrix sets obtained according to a second pre-coding matrix set and according to a third pre-coding matrix set, the first pre-coding matrix set is obtained based on each second pre-coding matrix in the second pre-coding matrix set and based on the third pre-coding matrix set, and the base station determines the first pre-coding matrix set in the first sub-band according to the first PMI. Or, the indication information of the first pre-coding matrix set in the first sub-band includes a first PMI and a second PMI, where the first PMI is an index of a fourth pre-coding matrix set in the first codebook, the second PMI is an index of the first pre-coding matrix set in the fourth pre-coding matrix set, the first codebook includes multiple first pre-coding matrix sets obtained according to a second pre-coding matrix set and according to a third pre-coding matrix set, and the fourth pre-coding matrix set includes one or more first pre-coding matrix sets, and is a subset of the first codebook, and the base station determines the first pre-coding matrix set in the first sub-band according to the first PMI and according to the second PMI.

In an implementation, an i-th physical resource in the first sub-band corresponds to a k-th first pre-coding matrix in the first pre-coding matrix set, where k=i mod K, wherein i=0, 1, 2 ... N, k=0, 1, 2, 3, ..., K−1, K is the number of first pre-coding matrices in the first pre-coding matrix set, and N is the number of physical resources in the first sub-band; or, k=ceil(i/v) mod K, ceil(i/v) represents the minimum integer no less than i/v, v=RI, or v is the number of antenna ports, i=0, 1, 2 ... N, k=0, 1, 2, 3, ..., K−1, K is the number of first pre-coding matrices in the first pre-coding matrix set, and N is the number of physical resources in the first sub-band.

An embodiment of the disclosure provides a base station. The base station includes: a receiving module configured to receive feedback of CSI provided by a terminal, where the CSI comprises indication information of a first pre-coding matrix set in a first sub-band; a determining module configured to determine the first pre-coding matrix set in the first sub-band according to the indication information, where the first pre-coding matrix set comprises one or more first pre-coding matrices, and each physical resource in the first sub-band corresponds to a first pre-coding matrix in the first pre-coding matrix set; and a pre-coding module configured to pre-code data to be transmitted over a physical resource in the first sub-band using the first pre-coding matrix corresponding to the physical resource according to the first pre-coding matrix set.

In an implementation, the determining module is configured to: determine an index of a first vector group in a preset vector group set according to the indication information; and obtain the first pre-coding matrix set in the first sub-band according to the first vector group and according to one or more phase factors in a phase set.

In an implementation, the indication information of the first pre-coding matrix set in the first sub-band includes a first PMI, where the first PMI is an index of the first pre-coding matrix set in a first codebook, and the first codebook comprises multiple first pre-coding matrix sets obtained according to a preset vector group set and according to a preset phase set, and the base station determines the first pre-coding matrix set in the first sub-band according to the first PMI. Or, the indication information of the first pre-coding matrix set in the first sub-band includes a first PMI and a second PMI, where the first PMI is an index of a fourth pre-coding matrix set in the first codebook, the second PMI is an index of the first pre-coding matrix set in the fourth pre-coding matrix set, the first codebook includes multiple first pre-coding matrix sets obtained according to the preset vector group set and according to the preset phase set, and the fourth pre-coding matrix set includes one or more first pre-coding matrix sets, and is a subset of the first codebook, and the base station determines the first pre-coding matrix set in the first sub-band according to the first PMI and according to the second PMI.

In an implementation, the determining module is configured to: determine an index of a second pre-coding matrix in a second pre-coding matrix set according to the indication information; and obtain the first pre-coding matrix set in the first sub-band according to the second pre-coding matrix and according to a preset third pre-coding matrix set, where each first pre-coding matrix in the first pre-coding matrix set is obtained as a result of calculation operation based on both the second pre-coding matrix and a third pre-coding matrix in the third pre-coding matrix set.

In an implementation, the indication information of the first pre-coding matrix set in the first sub-band includes a first PMI, the first PMI is an index of the first pre-coding matrix set in a first codebook the first codebook includes multiple first pre-coding matrix sets obtained according to a second pre-coding matrix set and according to a third pre-coding matrix set, the first pre-coding matrix set is obtained based on each second pre-coding matrix in the second pre-coding matrix set and based on the third pre-coding matrix set, and the base station determines the first pre-coding matrix set in the first sub-band according to the first PMI. Or, the indication information of the first pre-coding matrix set in the first sub-band includes a first PMI and a second PMI, where the first PMI is an index of a fourth pre-coding matrix set in the first codebook, the second PMI is an index of the first pre-coding matrix set in the fourth pre-coding matrix set, the first codebook includes multiple first pre-coding matrix sets obtained according to a second pre-coding matrix set and according to a third pre-coding matrix set, and the fourth pre-coding matrix set includes one or more first pre-coding matrix sets, and is a subset of the first codebook, and the base station determines the first pre-coding matrix set in the first sub-band according to the first PMI and according to the second PMI.

BRIEF DESCRIPTION OF THE DRAWINGS

In order to make the technical solutions according to the embodiments of the disclosure more apparent, the drawings to which a description of the embodiments refers to will be introduced below in brief. Apparently the drawings to be described only illustrate some embodiments of the disclosure, and those ordinarily skilled in the art can further derive other drawings from these drawings without any inventive effort.

DETAILED DESCRIPTION OF THE EMBODIMENTS

Figure 1:
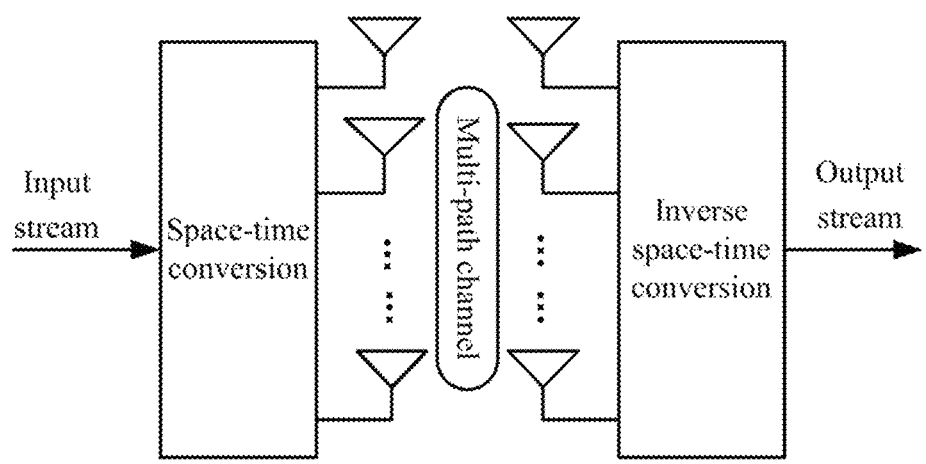
FIG. 1 is a schematic structural diagram of a conventional MIMO system with a single user as an example.

In order to make the objects, technical solutions, and advantages of the embodiments of the disclosure more apparent, the technical solutions according to the embodiments of the disclosure will be described below clearly and fully with reference to the drawings in the embodiments of the disclosure. Apparently the embodiments to be described are only a part but not all of the embodiments of the disclosure. Based upon the embodiments described herein, all other embodiments which can occur to those ordinarily skilled in the art without any inventive effort shall fall into the scope of the disclosure.

It shall be appreciated that the technical solutions according to the disclosure are applicable to various communication systems, e.g., a Global System of Mobile communication (GSM) system, a Code Division Multiple Access (CDMA) system, a Wideband Code Division Multiple Access (WCDMA) system, a General Packet Radio Service (GPRS) system, an LIE system, an Advanced LTE (LTE-A) system, a Universal Mobile Telecommunication System (UMTS) system, and etc.

It shall be further appreciated that in the embodiments of the disclosure, a User Equipment (UE) includes but is not limited to a Mobile Station (MS), a mobile terminal, a mobile telephone, a handset, a portable equipment, and etc., and the user equipment can communicate with one or more core networks over a Radio Access Network (RAN). For example, the user equipment can be a mobile phone (referred to as a cell phone), a computer with a function of radio communication, and etc., and the user equipment can also be a portable, pocket, handheld, built-in-computer, or on-vehicle mobile device.

In the embodiments of the disclosure, a base station (e.g., an access point) can be such a device in an access network that communicates with a radio terminal over one or more sectors via an air interface. The base station can be configured to convert a received air frame into an Internet Protocol (IP) packet, convert a received IP packet into an air frame, and operate as a router between the radio terminal and the remaining components of the access network, where the remaining components of the access network can include an IP network. The base station can further coordinate attribute management on the air interface. For example, the base station can be a Base Communication module Station (BIS) in a GSM or CDMA system, or can be a Node B in a WCDMA system, or can be an evolved Node B (eNB or e-Node B) in an LTE system, although the disclosure is not limited thereto.

In order to make the objects, technical solutions, and advantages of the embodiments of the disclosure more apparent, the disclosure will be described below in further details with reference to the drawings. Apparently the embodiments to be described are only a part but not all of the embodiments of the disclosure. Based upon the embodiments here of the disclosure, all the other embodiments which can occur to those ordinarily skilled in the art without any inventive effort shall fall into the scope of the disclosure.

The capacity of a system is extended, and the throughput thereof is improved, in an LTE network by using the MIMO technology. FIG. 1 illustrates a structural block diagram of an MIMO system serving a single user, for example, where both a transmitter (e.g., a base station) and a receiver (e.g., a terminal) are provided with multiple antennas. At the transmitter, an input serial code stream is converted into several parallel separate code sub-streams through a series of preprocessing (e.g., modulation, encoding, weighting, and mapping), and the code sub-streams are transmitted through different transmit antennas. At the receiver, multiple branches of signals are received by using a group of antennas, the number of which is no less than the number of transmitting antennas, and the received signals are processed in the spatial domain and in the time domain according to estimated coding relationships between channel transmission characteristics and transmitted code sub-streams, so that the signals are separated into several transmitted code sub-streams, and the code sub-streams are further converted into serial data to be output.

However, as the capacity is extended, interference also becomes higher accordingly due to the correlation between channels in a channel matrix. In order to alleviate the complexity of implementing the terminal from being affected by the interference between the channels, also to lower overhead of the system, and to improve the capacity of the MIMO system as much as possible, pre-coding has been introduced in the existing technology.

Closed-loop pre-coding has been introduced to the LTE Rel-8 system so as to improve the spectrum efficiency. The same set of pre-coding matrices, which is referred to as a codebook, is stored in both the base station and the terminal as required for closed-loop pre-coding. After the terminal estimates channel information by using a cell-common pilot, it selects a pre-coding matrix from the codebook as per some criterion, and feeds the index of the pre-coding matrix in the codebook back to the base station over an uplink channel, where the index is denoted as a PMI. The base station determines the pre-coding matrix used for the terminal according to the received PMI. The terminal further reports a corresponding RI and CQI together with the PMI, so that the base station determines the number of codewords, the number of transmission layers for downlink transmission, and modulating and coding schemes for the respective codewords.

Different numbers of transmission layers (ranks) might correspond to codebooks having different sizes and including different codewords. In the LTE system, downlink transmission of at most two codewords is supported, each codeword can have a different modulation and coding scheme, and a separate Hybrid Automatic Repeat Request (HARQ) process is used for each codeword. If the number of downlink transmission layers is more than 2, then a codeword may be mapped to a plurality of data streams (a data stream is a layer). A mapping relationship between a codeword and a transmission layer is predefined: if the number of layers, L, is an even number, then the number of transmission layers to Which each codeword is mapped is L/2, and if the number of transmission layers, L, is an odd number, then the number of transmission layers to which two codewords are mapped are (L−1)/2 and (L+1)/2, respectively.

Figure 2:
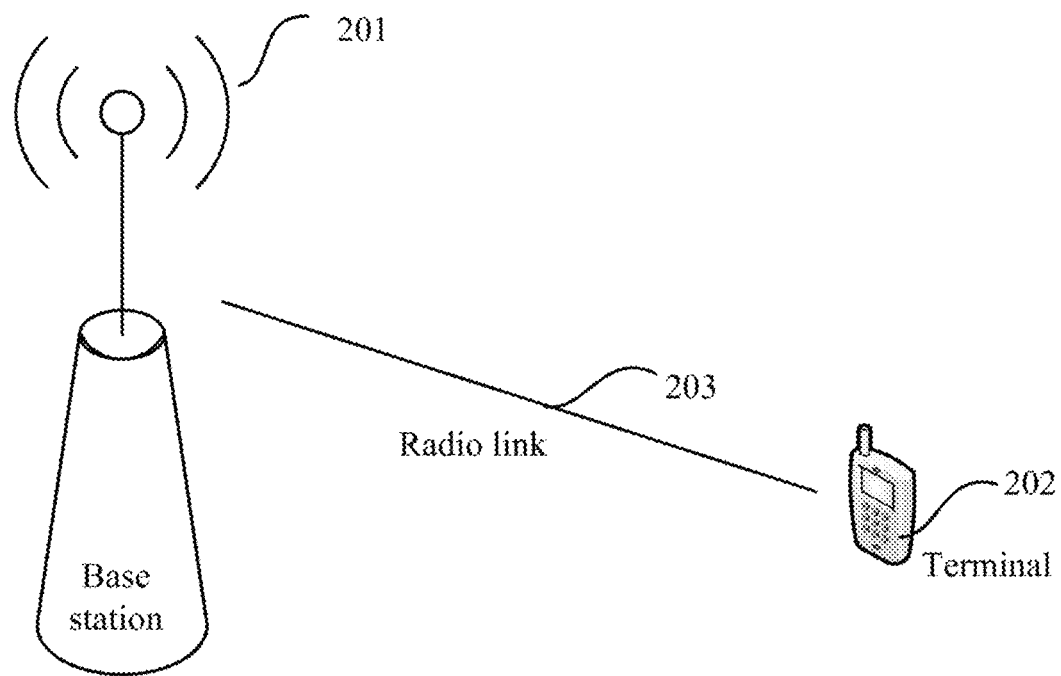
FIG. 2 is a schematic structural diagram of conventional transmission through codebook based pre-coding.

FIG. 2 illustrates a structural diagram of a conventional radio network using codebook based pre-coding, where the radio network includes a base station 201, a terminal 202, and a radio link 203. Both the terminal 202 and the base station 201 are provided with multiple antennas. The same set of pre-coding matrices (codebook) is configured on both the terminal 202 and the base station 201. After the terminal 202 measures a downlink channel and determines a pre-coding matrix, it feeds CSI back to the base station 201 over the radio link 203, where the CSI includes one or more of a CQI indicating the quality of a radio communication channel between the base station and the terminal, a PMI indicating a preferred pre-coding matrix for shaping a signal to be transmitted, an RI indicating the number of useful transmission layers of a data channel preferred by the terminal, and an estimated channel coefficient. The CSI is fed back so that the base station 201 can configure adaptively an appropriate transmission scheme to improve a coverage area, or to improve a transmission ratio of user data, or to predicate the channel quality for future transmission to the terminal 202 more precisely.

There is such significant signaling overhead of the terminal providing feedback of CSI in the existing downlink MIMO feedback mechanism that no corresponding gain in performance can be achieved especially in transmission at a high rank. Furthermore, the performance of the existing codebook design is greatly degraded in the scenario of mobility at a high speed, so the efficiency of transmission cannot be guaranteed. Accordingly, it is highly desirable in the industry to lower signaling overhead of the terminal providing feedback of CSI.

In order to lower signaling overhead of the terminal providing feedback of CSI, the embodiments of the disclosure propose a solution to providing feedback of CSI. This solution is applicable to the scenario of downlink MIMO transmission. In the embodiments of the disclosure, the terminal determines for a sub-band a set of pre-coding matrices in the sub-band, determines a plurality of pre-coding matrices in the set as pre-coding matrices over different physical resources in the sub-band so as to measure a CQI, and feeds back the corresponding CSI. Since data is pre-coded over the different physical resources by using the different pre-coding matrices, and indication information of the determined set of pre-coding matrices is fed back, the feedback overhead can be lowered, and also the performance in the scenario of mobility at a high speed can be guaranteed. The embodiments of the disclosure will be described in details with reference to the drawings.

Figure 3:
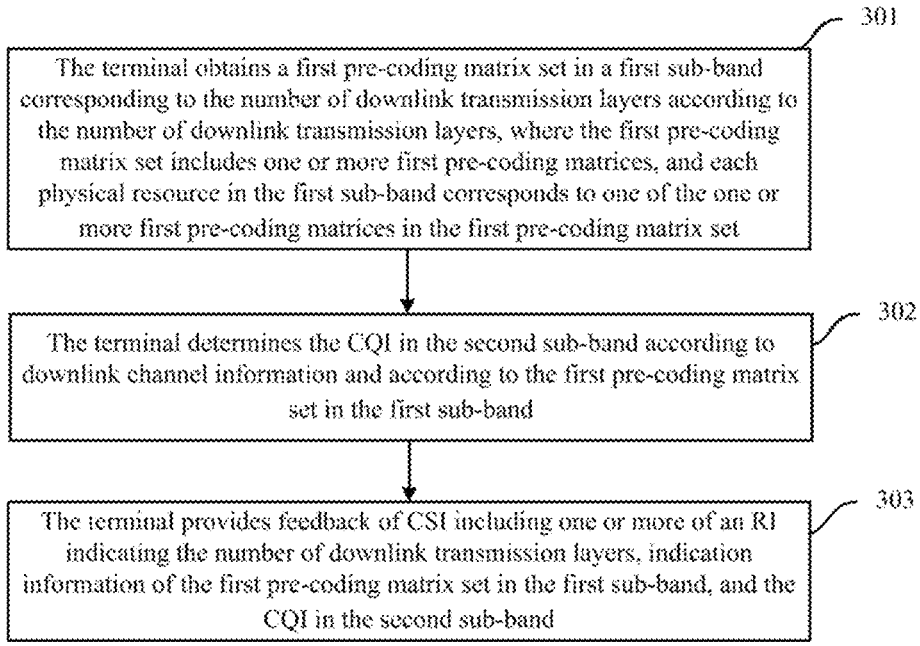
FIG. 3 is a schematic flow chart of providing feedback of CSI according to an embodiment of the disclosure.

In order to make the flow as illustrated in FIG. 3 more apparent, some technical terms in the flow as illustrated in FIG. 3 will be firstly described below.

A sub-band is a granularity unit, in the frequency domain, at which channel information is fed back at a physical layer in an LIE system. A system bandwidth can be divided into several sub-bands. For example, the size of a sub-band may be multiple PRBs such as 4, 6, or 8, dependent upon different system bandwidths.

A first sub-band is a sub-band having a first bandwidth. In the embodiments of the disclosure, the first sub-band can include one or more PRBs, or the width of the first sub-band may be the system bandwidth. A terminal and a base station can agree on in advance the bandwidth of the first sub-band.

A second sub-band is a sub-band having a second bandwidth. In the embodiments of the disclosure, the second sub-band can include one or more PRBs, or the width of the second sub-band may be the system bandwidth. The terminal and the base station can agree on in advance the bandwidth of the second sub-band.

In the embodiments of the disclosure, the bandwidth of the second sub-band is more than or equal to the bandwidth of the first sub-band.

In the embodiments of the disclosure, the second sub-band may be the same as the first sub-band, or the second sub-band may include a plurality of first sub-bands.

A physical resource is defined as follows: in the embodiments of the disclosure, different physical resources can be different time resources, or can be different frequency resources, or can be different combinations of time and frequency resources. In an implementation, a physical resource in a preset bandwidth can be a Resource Element (RE), a sub-carrier, a PRB, or a set of PRBs. Or a physical resource in a preset bandwidth can be an RE, a sub-carrier, a RPB, or a set of PRBs, for transmitting data symbol(s).

For example, different PRBs in the first sub-band correspond to extended pre-coding matrices obtained through different column vector arrangement patterns, or the different REs for transmitting data in the first sub-band correspond to extended pre-coding matrices obtained through different column vector arrangement patterns.

A vector group set is defined as follows: in the embodiments of the disclosure, a vector group set for obtaining a first pre-coding matrix set can be a vector group set agreed on in ilk advance between the terminal and the base station. For example, the vector group set, or a first code-book obtained from the vector group set, is written in a protocol, where the first codebook includes one or more first pre-coding matrix sets.

In the embodiments of the disclosure, a vector group for obtaining a second pre-coding matrix set can be a vector group in a vector group set agreed on in advance between the terminal and the base station. For example, the vector group set, or a second codebook obtained from the vector group set, is written in the protocol, Where the second codebook includes one or more second pre-coding matrices.

In the embodiments of the disclosure, a vector group in the vector group set includes one or more vectors. If there are a plurality of vectors in the group, then there may be fixed phase relationships between every two of the vectors, that is, one vector in the vector group can be derived from another vector in the vector group. In some embodiments of the disclosure, adjacent vectors in the vector group are spaced by a fixed number D of vectors in a vector group set $\{V_t\}$ having a preset size of T. The k-th vector group in the vector group set obtained as such can be represented as $\{V_{t,1}=v_{t \bmod T}, V_{t,2}=v_{(t+D) \bmod T}, \ldots, V_{t,n}=v_{(t+(n-1)*D) \bmod T}\}$.

In some embodiments of the disclosure, the vectors in the vector groups in the vector group set are Discrete Fourier Transform (DFT) vectors, or antenna array response vectors.

For example, all the vectors are selected from a preset set of vectors $\{V_t=v_m\}$, where $v_m=[1 \ e^{j2\pi m/32}]^T$, or $v_m=[1 \ e^{j2\pi m/32} \ e^{j4\pi m/32} \ e^{j6\pi m/32}]^T$, or $v_m=[1 \ e^{-j2\pi d \cos(\theta_m)} \ldots e^{-j2\pi (M-1)d \cos(\theta_m)}]^T$, and etc. Here d is a distance between antennas in a unit of wavelength, and M is a vector length. Different values of m correspond to different vectors. For example, the t-th vector $V_t$ in the set is equal to where $v_m$, where m=n*(t−1). Here n is a preset fixed integer, and k=1, 2, . . . , (32/n).

It shall be noted that for the sake of a convenient description, a matrix as referred to herein is defined without taking normalization of power into account. In a practical application, the matrix can be multiplied by a corresponding power coefficient, e.g., ½, ¼, and etc., to keep the power unchanged.

FIG. 3 illustrates a schematic flow chart of a method for providing feedback of CSI according to an embodiment of the disclosure, and the flow can be performed by a terminal.

As illustrated in FIG. 3, the flow includes the following operations 301-303.

At the operation 301, the terminal obtains a first pre-coding matrix set in a first sub-band corresponding to the number of downlink transmission layers according to the number of downlink transmission layers, where the first pre-coding matrix set includes one or more first pre-coding matrices, and each physical resource in the first sub-band corresponds to one of the ilk one or more first pre-coding matrices in the first pre-coding matrix set.

Here the number of downlink transmission layers (or referred to as the number of downlink data streams, i.e., the value of an RI) can be estimated by the terminal according to downlink channel information, or can be agreed on in advance between the terminal and a base station.

In an implementation, the number of first pre-coding matrices in the first pre-coding matrix set in the first sub-band is the same as the number of downlink transmission layers.

In some embodiments of the disclosure, an i-th physical resource in the first sub-band corresponds to a k-th first pre-coding matrix in the first pre-coding matrix set. Here k=i mod K, i=0, 1, 2, . . . N, k=0, 1, 2, 3, . . . , K−1, K is the number of first pre-coding matrices in the first pre-coding matrix set, and N is the number of physical resources in the first sub-band. Or, k=ceil(i/v) mod K, where ceil(i/v) represents a minimum integer no less than i/v, v is the number of antenna ports, i=0, 1, 2 . . . N, k=0, 1, 2, 3, . . . , K−1, K is the number of first pre-coding matrices in the first pre-coding matrix set, and N is the number of physical resources in the first sub-band.

In an implementation, the operation 301 can be performed in the following implementations without any limitation thereto.

In a first scheme, the terminal obtains the first pre-coding matrix set in the first sub-band corresponding to the number of downlink transmission layers, according to one or more vector groups in a preset vector group set, and according to one or more phase factors in a preset phase set.

The vector group set includes one or more vector groups, and each vector group is configured for obtaining a first pre-coding matrix set. If the vector group set has multiple vector groups, then different first pre-coding matrix sets may be obtained by using the different vector groups.

In the embodiment of the disclosure, a set consisting of all the first pre-coding matrix sets obtained from the vector group set can also be referred to as a first codebook.

The preset phase set includes one or more phase factors, and each of the one or more first pre-coding matrices in the first pre-coding matrix set is obtained based upon a phase factor in the preset phase set. If the preset phase set includes multiple phase factors, then a different pre-coding matrix in a first pre-coding matrix set corresponding to a vector group in the vector group set may be obtained by using both the vector group and a different phase factor in the phase set. In the embodiment of the disclosure, the phase set is represented as $\{\varphi_n\}$, $\varphi_n$ is a phase factor in the phase set, 0<=n<N, and N is the number of one or more phase factors in the phase set.

In some embodiments of the disclosure, the phase set is $\{\varphi_n=e^{jn\pi/2}\}$ or $\{\varphi_n=e^{jn\pi}\}$, where n is an integer, 0<=n<N, and N is the number of one or more phase factors in the phase set.

In the first scheme, the first pre-coding matrix set is obtained according to one or more vector groups in a preset vector group set, and according to one or more phase factors in a preset phase set. By way of an example, if a vector group $\{V_1, \ldots, V_m, \ldots, V_M\}$ in the preset vector group set is a vector group including M column vectors, the phase set $\{\varphi_n\}$ includes N phase factors, where $\varphi_n$ represents a phase factor in the phase set, and the number of downlink transmission layers is 4, then the first pre-coding matrices in the obtained first pre-coding matrix set corresponding to Rank=4 may be represented as:

$$W_1 = \begin{bmatrix} V_{i1} & V_{i2} & V_{i3} & V_{i4} \\ \varphi_n V_{i1} & -\varphi_n V_{i2} & \varphi_n V_{i3} & -\varphi_n V_{i4} \end{bmatrix},$$

$$\text{or } W_1 = \begin{bmatrix} V_{i1} & V_{i2} & V_{i3} & V_{i4} \\ \varphi_n V_{i1} & -\varphi_n V_{i2} & j\varphi_n V_{i3} & -j\varphi_n V_{i4} \end{bmatrix},$$

and etc.

Here all of i1, i2, i3, and i4 are positive integers more than or equal to 1, and less than or equal to M.

For example, if i1=i2=1, i3=i4=2, M=2, and N=1, the first pre-coding matrices in the first pre-coding matrix set at Rank=4 may be:

$$W_1 = \begin{bmatrix} V_1 & V_1 & V_2 & V_2 \\ V_1 & -V_1 & V_2 & -V_2 \end{bmatrix}, \text{ or } W_1 = \begin{bmatrix} V_1 & V_1 & V_2 & V_2 \\ V_1 & -V_1 & jV_2 & -jV_2 \end{bmatrix},$$

and etc.

In another example, if i1=1, i2=2, i3=3, i4=4, M=2, and N=1, the first pre-coding matrices in the first pre-coding matrix set at Rank=4 may be:

$$W_1 = \begin{bmatrix} V_1 & V_2 & V_3 & V_4 \\ V_1 & -V_2 & V_3 & -V_4 \end{bmatrix}, \text{ or } W_1 = \begin{bmatrix} V_1 & V_2 & V_3 & V_4 \\ V_1 & -V_2 & jV_3 & -jV_4 \end{bmatrix},$$

and etc.

In the case that the number of downlink transmission layers is another value, that is, the value of Rank is another value, then the first pre-coding matrices in the first pre-coding matrix set may be obtained similarly.

For example, the number of downlink transmission layers is 3, and if i1=i2=1, i3=2, M=2, and N=1, the first pre-coding matrices in the first pre-coding matrix set at Rank=3 may be $$W_1 = \begin{bmatrix} V_1 & V_1 & V_2 \\ V_1 & -V_1 & -V_2 \end{bmatrix}, \text{ or } W_1 = \begin{bmatrix} V_1 & V_1 & V_2 \\ V_1 & -V_1 & V_2 \end{bmatrix},$$

$$\text{or } W_1 = \begin{bmatrix} V_1 & V_1 & V_2 \\ V_1 & -V_1 & -jV_2 \end{bmatrix}, \text{ or } W_1 = \begin{bmatrix} V_1 & V_1 & V_2 \\ V_1 & -V_1 & jV_2 \end{bmatrix},$$

and etc. If i1=i2=1, i3=4=2, and N=1, the first ore-coding matrices in the first pre-coding matrix set at Rank=3 may be $$W_1 = \begin{bmatrix} V_1 & V_1 & V_2 \\ V_1 & -V_1 & -V_2 \end{bmatrix}, \text{ and } W_1 = \begin{bmatrix} V_1 & V_1 & V_2 \\ jV_1 & -jV_1 & -jV_2 \end{bmatrix}.$$

If i1=1, i2=2, i3=3, M=3, and N=1, the first pre-coding matrices in the first pre-coding matrix set at Rank=3 may be $$W_1 = \begin{bmatrix} V_1 & V_2 & V_3 \\ V_1 & -V_2 & -V_3 \end{bmatrix}, \text{ or } W_1 = \begin{bmatrix} V_1 & V_2 & V_3 \\ V_1 & -V_2 & V_3 \end{bmatrix},$$

$$\text{or } W_1 = \begin{bmatrix} V_1 & V_2 & V_3 \\ V_1 & -V_2 & jV_3 \end{bmatrix}, \text{ or } W_1 = \begin{bmatrix} V_1 & V_2 & V_3 \\ V_1 & -V_2 & -jV_3 \end{bmatrix},$$

and etc. Or the first pre-coding matrix set corresponding to the number of downlink transmission layers (Rank=3) can be obtained by taking the first three columns in the first pre-coding matrices in the first pre-coding matrix set corresponding to the number of downlink transmission layers (Rank=4) respectively.

In an implementation of the first scheme, the first pre-coding matrix set is obtained according to one or more vector groups in the preset vector group set and according to one or more phase factors in the preset phase set by: performing a Kronecker product operation on a phase matrix and one or more vectors in a vector group in the vector group set, where the phase matrix is obtained based upon a phase factor in the preset phase set; and, constituting one of the one or more first pre-coding matrices in the first pre-coding matrix set by using column vectors in a matrix obtained as a result of the Kronecker product operation.

A phase matrix $w_n$ is obtained based upon a phase factor $\varphi_n$. In some embodiments of the disclosure, the phase matrix can be $$w_n = \begin{bmatrix} 1 & 1 \\ \varphi_n & -\varphi_n \end{bmatrix}, \text{ or } w_n = \begin{bmatrix} 1 \\ \varphi_n \end{bmatrix}, \text{ or } w_n = \begin{bmatrix} 1 \\ -\varphi_n \end{bmatrix}.$$

Furthermore, in the first scheme, the first pre-coding matrix sets is obtained according to one or more vector groups in the preset vector group set and according to one or more phase factors in the preset phase set as follows.

Since the number of columns in a first pre-coding matrix in a first pre-coding matrix set is the same as the number of downlink transmission layers, if the number of downlink transmission layers is an even number (e.g., 2*L, where L is an integer more than or equal to 1), then a Kronecker product operation may be performed on the phase matrix $$w_n = \begin{bmatrix} 1 & 1 \\ \varphi_n & -\varphi_n \end{bmatrix}$$

and L vectors in the vector group, and resulting column vectors may be concatenated into a matrix including 2*L columns, where the number of columns in the matrix is the same as the number of downlink transmission layers (2*L), so that all the column vectors in the matrix are selected, that is, the matrix including 2*L columns may be a first pre-coding matrix in the first pre-coding matrix set. If the number of downlink transmission layers is an odd number (e.g., 2*L+1), then a Kronecker product operation may be performed on the phase matrix $w_n=$ $$\begin{bmatrix} 1 & 1 \\ \varphi_n & -\varphi_n \end{bmatrix}$$

and L vectors in the vector group to obtain 2*L column vectors, then a Kronecker product operation may be performed on another vector in the vector group and the phase matrix $$w_n = \begin{bmatrix} 1 \\ \varphi_n \end{bmatrix}, \text{ or } w_n = \begin{bmatrix} 1 \\ -\varphi_n \end{bmatrix}$$

to obtain the (2*L+1)-th column vector, and the resulting 2*L column vectors and the (2*L+1)-th column vector may be concatenated into a matrix including (2*L+1) columns, where the number of columns in the matrix is the same as the number of downlink transmission layers (2*L+1), so that all the column vectors in the matrix are selected, that is, the matrix including (2*L+1) columns may be a first pre-coding matrix in the first pre-coding matrix set.

In an implementation, a first pre-coding matrix in a first pre-coding matrix set can be obtained according to one or more vector groups in the preset vector group set and according to one or more phase factors in the preset phase set, as follows.

If the vector group is represented as $\{V_1, \ldots, V_m, \ldots, V_M\}$, then a Kronecker product operation may be performed on the phase matrix $$w_n = \begin{bmatrix} 1 & 1 \\ \varphi_n & -\varphi_n \end{bmatrix}$$

obtained based upon the phase factor $\varphi_n$, and each of the vectors $V_1, \ldots, V_m, \ldots, V_M$ in the vector group, respectively, to obtain a matrix which can be represented as $W_n = \beta[w_n \otimes V_1 \ w_n \otimes V_2 \ldots w_n \otimes V_M]$, where $\beta$ represents a constant power factor. K column vectors are selected from the obtained matrix $W_n = \beta[w_n \otimes V_1 \ w_n \otimes V_2 \ldots w_n \otimes V_M]$ as a first pre-coding matrix in the first pre-coding matrix set according to the number K of downlink transmission layers. For example, if the number of downlink transmission layers is K, then a first pre-coding matrix (Rank=K) in the first pre-coding matrix set may be obtained by selecting K column vectors in the obtained matrix (Rank=I), where I>K.

In an implementation, for a matrix obtained by performing a Kronecker product operation on both a phase matrix and a vector in a vector group, the first K column vectors in the matrix are selected according to the number of downlink transmission layers (e.g., K) as a first pre-coding matrix in a first pre-coding matrix set.

In an implementation, for example, the one or more phase factors in the phase set are $\varphi_n = e^{jn\pi/2}$, where n=0, 1, the constant power factor $\beta$ 1, and K is the number of downlink transmission layers, A Kronecker product operation is performed on the vectors in the vector group $\{V_1, \ldots, V_m, \ldots, V_M\}$, and the phase matrix $$w_n = \begin{bmatrix} 1 & 1 \\ 1 & -1 \end{bmatrix},$$

based upon $\varphi_0 = 1$ to obtain the matrix $$W_1 = \begin{bmatrix} V_1 & V_1 & V_2 & V_2 & \cdots & V_M & V_M \\ V_1 & -V_1 & V_2 & -V_2 & \cdots & V_M & -V_M \end{bmatrix},$$

and the first K column vectors in the matrix Wi are selected as a first pre-coding matrix in a first pre-coding matrix set. A Kronecker product operation is performed on the first pre-coding matrix and the phase matrix $$w_n = \begin{bmatrix} 1 & 1 \\ j & -j \end{bmatrix}$$

based upon $\varphi_1 = j$ to obtain the matrix $$W_2 = \begin{bmatrix} V_1 & V_1 & V_2 & V_2 & \cdots & V_M & V_M \\ jV_1 & -jV_1 & jV_2 & -jV_2 & \cdots & jV_M & -jV_M \end{bmatrix},$$

and the first K column vectors in the matrix $W_2$ are selected as a first pre-coding matrix in another first pre-coding matrix set.

In another example, the one or more phase factors in the phase set are $\varphi_n = e^{jn\pi}$, where n=0, 1, the constant power factor $\beta$ is 1, and K is the number of downlink transmission layers. A Kronecker product operation is performed on the vector group $\{V_1, \ldots, V_m, \ldots, V_M\}$ and the phase matrix $$w_n = \begin{bmatrix} 1 & 1 \\ 1 & -1 \end{bmatrix}$$

based upon $\varphi_0 = 1$ to obtain the matrix $$W_1 = \begin{bmatrix} V_1 & V_1 & V_2 & V_2 & \cdots & V_M & V_M \\ V_1 & -V_1 & V_2 & -V_2 & \cdots & V_M & -V_M \end{bmatrix},$$

and the first K column vectors in the matrix $W_1$ are selected as a first pre-coding matrix in a first pre-coding matrix set. A Kronecker product operation is performed on the first pre-coding matrix and the phase matrix $$w_n = \begin{bmatrix} 1 & 1 \\ 1 & -1 \end{bmatrix}$$

based upon $\varphi_1 = -1$ to obtain the matrix $$W_2 = \begin{bmatrix} V_1 & V_1 & V_2 & V_2 & \cdots & V_M & V_M \\ -V_1 & V_1 & -V_2 & V_2 & \cdots & -V_M & V_M \end{bmatrix},$$

and the first K column vectors in the matrix $W_2$ are selected as a first pre-coding matrix in another first pre-coding matrix set.

As such, different pre-coding matrices in a first pre-coding matrix set corresponding to a vector group in the vector group set can be obtained based on the vector group and different phase factors $\varphi_n$ in the phase set $\{\varphi_n\}$, where N represents the number of phase factors in the phase set, so a first pre-coding matrix set including N first pre-coding matrices can be obtained based on a vector group in the vector group set.

Since the vector group set includes one or more vector groups, multiple first pre-coding matrix sets in the first sub-band corresponding to the number of downlink transmission layers may be obtained at the operation 301.

In the case that multiple first pre-coding matrix sets in the first sub-band corresponding to the number of downlink transmission layers are obtained, one of the multiple first pre-coding matrix sets is selected as the first pre-coding matrix set obtained at the operation 301 as per a preset criterion.

In an implementation, the terminal can assume that physical resources in the first sub-band are pre-coded by using each of the multiple first pre-coding matrix sets, respectively, and then select one of the multiple first pre-coding matrix sets by comparing physical quantities such as channel capacities, transport block sizes, or Signal-to-Interference-plus-Noise Ratios (SINRs), which are calculated by using the multiple different first pre-coding matrix sets. In an implementation, different first pre-coding matrices in a first pre-coding matrix set are assumed to be pre-coding matrices for transmitting data symbols over the different physical resources in the first sub-band, so that the corresponding physical quantities are measured, and a measured physical quantity corresponding to the first pre-coding matrix set is further obtained.

In a second scheme, the terminal obtains the first pre-coding matrix set in the first sub-band corresponding to the number of downlink transmission layers according to both a second pre-coding matrix and a third pre-coding matrix set. Each first pre-coding matrix in the first pre-coding matrix set is obtained as a result of calculation operation based on both the second pre-coding matrix and a pre-coding matrix in the third pre-coding matrix set.

The second pre-coding matrix is a matrix in a second pre-coding matrix set, and the second pre-coding matrix set is agreed on in advance between the terminal and the base station.

In an implementation, the second pre-coding matrix consists of a vector in a vector group in a preset vector group set.

Or the second pre-coding matrix consists of a plurality of vectors in a vector group in a preset vector group set. Or the second pre-coding matrix consists of one or more vectors in a vector group in a preset vector group set and a vector of zeros, where the vector of zeros is such a vector that all the elements thereof are zero. That is, the second pre-coding matrix can be a vector in the vector group, or each column vector in the second pre-coding matrix is a vector in the vector group, or each column vector in the second pre-coding matrix consists of a vector in the vector group and a vector of zeros.

In the embodiment of the disclosure, a second pre-coding matrix set consisting of the second pre-coding matrices obtained according to the vectors in the vector groups in the vector group set can also be referred to as a second codebook.

For example, the vector group for obtaining the second pre-coding matrix set is a vector group including P column vectors, which is $\{V_1, \ldots, V_p, \ldots, V_P\}$, and the number of downlink transmission layers is 4 (Rank=4). When P=1, the second pre-coding matrices in the second pre-coding matrix set can be $W_2=V_1$ or $$W_2 = \begin{bmatrix} V_1 & 0 \\ 0 & V_1 \end{bmatrix},$$

and etc. When P=2, the second pre-coding matrices in the second pre-coding matrix set can be $W_2=[V_1\ V_2]$ or $$W_2 = \begin{bmatrix} V_1 & 0 \\ 0 & V_2 \end{bmatrix} \text{ or } W_2 = \begin{bmatrix} V_1 & 0 & V_2 & 0 \\ 0 & V_1 & 0 & V_2 \end{bmatrix},$$

and etc. When P=4, the second pre-coding matrices in the second pre-coding matrix set can be $$W_2 = \begin{bmatrix} V_1 & 0 & V_3 & 0 \\ 0 & V_2 & 0 & V_4 \end{bmatrix},$$

and etc.

The third pre-coding matrix set is agreed on between the terminal and the base station.

For example, it can be predefined in a protocol.

For example, the third pre-coding matrix set is a set of block diagonal matrices:

$$W_{3,1} = \begin{bmatrix} 1 & 1 & 0 & 0 \\ 1 & -1 & 0 & 0 \\ 0 & 0 & 1 & 1 \\ 0 & 0 & 1 & -1 \end{bmatrix}, W_{3,2} = \begin{bmatrix} 1 & 1 & 0 & 0 \\ -1 & 1 & 0 & 0 \\ 0 & 0 & 1 & 1 \\ 0 & 0 & -1 & 1 \end{bmatrix},$$

$$W_{3,3} = \begin{bmatrix} 0 & 0 & 1 & 1 \\ 0 & 0 & 1 & -1 \\ 1 & 1 & 0 & 0 \\ 1 & -1 & 0 & 0 \end{bmatrix}, W_{3,4} = \begin{bmatrix} 0 & 0 & 1 & 1 \\ 0 & 0 & -1 & 1 \\ 1 & 1 & 0 & 0 \\ -1 & 1 & 0 & 0 \end{bmatrix}.$$

In another example, the third pre-coding matrix set is a set of column-swapping matrices:

$$W_{3,1} = \begin{bmatrix} 1 & 0 & 0 & 0 \\ 0 & 1 & 0 & 0 \\ 0 & 0 & 1 & 0 \\ 0 & 0 & 0 & 1 \end{bmatrix}, W_{3,2} = \begin{bmatrix} 0 & 0 & 0 & 1 \\ 1 & 0 & 0 & 0 \\ 0 & 1 & 0 & 0 \\ 0 & 0 & 1 & 0 \end{bmatrix},$$

$$W_{3,3} = \begin{bmatrix} 0 & 0 & 1 & 0 \\ 0 & 0 & 0 & 1 \\ 1 & 0 & 0 & 0 \\ 0 & 1 & 0 & 0 \end{bmatrix}, W_{3,4} = \begin{bmatrix} 0 & 1 & 0 & 0 \\ 0 & 0 & 1 & 0 \\ 0 & 0 & 0 & 1 \\ 1 & 0 & 0 & 0 \end{bmatrix}.$$

In another example, the third pre-coding matrix set is another set of matrices:

$$W_{3,1} = \begin{bmatrix} 1 & 1 & 1 & -1 \\ 1 & 1 & -1 & 1 \\ 1 & -1 & 1 & 1 \\ -1 & 1 & 1 & 1 \end{bmatrix}, W_{3,2} = \begin{bmatrix} 1 & 1 & -1 & 1 \\ 1 & 1 & 1 & -1 \\ -1 & 1 & 1 & 1 \\ 1 & -1 & 1 & 1 \end{bmatrix},$$

$$W_{3,3} = \begin{bmatrix} 1 & -1 & 1 & 1 \\ -1 & 1 & 1 & 1 \\ 1 & 1 & 1 & -1 \\ 1 & 1 & -1 & 1 \end{bmatrix}, W_{3,4} = \begin{bmatrix} 1 & -1 & -1 & -1 \\ -1 & 1 & -1 & -1 \\ -1 & -1 & 1 & -1 \\ -1 & -1 & -1 & 1 \end{bmatrix}.$$

In another example, the third pre-coding matrix set is another set of matrices:

$$W_{3,1} = \begin{bmatrix} 1 & 1 \\ 1 & -1 \end{bmatrix}, W_{3,2} = \begin{bmatrix} 1 & 1 \\ -1 & 1 \end{bmatrix}, W_{3,3} = \begin{bmatrix} 1 & 1 \\ j & -1 \end{bmatrix}, W_{3,4} = \begin{bmatrix} 1 & 1 \\ -j & j \end{bmatrix}.$$

In some embodiments of the disclosure, the operation on the second pre-coding matrix and a pre-coding matrix in the third pre-coding matrix set in the second scheme is a matrix multiplication operation or a matrix Kronecker product operation.

The operation on the second pre-coding matrix and the pre-coding matrix in the third pre-coding matrix set in the second scheme can be represented in the equation of $W_{1,n}=f(W_2, W_{3,n})$, where $f(\cdot)$ represents an operation.

In an implementation, the operation on the second pre-coding matrix and the pre-coding matrix in the third pre-coding matrix set in the second scheme is represented in the equation of $W_1=W_2W_3$ or $W_1=W_3W_2$. Or the operation on the second pre-coding matrix and the pre-coding matrix in the third pre-coding matrix set in the second scheme is a Kronecker product operation represented in the equation of $W_1=W_2 \otimes W_3$ or $W_1=W_3 \otimes W_2$.

In some embodiments of the disclosure, an index of a first pre-coding matrix in the first pre-coding matrix set obtained in the second scheme is an index of a third pre-coding matrix for obtaining the first pre-coding matrix as a result of the operation, in the preset third pre-coding matrix set.

From the perspective of physical resources, each physical resource in the first sub-band corresponds to a first pre-coding matrix in a first pre-coding matrix set. In the second scheme, a pre-coding matrix in the t-th first pre-coding matrix set corresponding to the t-th one of T consecutive physical resources in the first sub-band is obtained as a result of calculation operation based on both a second pre-coding matrix and the t-th third pre-coding matrix in the preset third pre-coding matrix set.

In an implementation, the first pre-coding matrix set can be obtained according to the second pre-coding matrix and according to the third pre-coding matrix set, as follows.

Q first pre-coding matrix sets in the first sub-band corresponding to the number of downlink transmission layers are obtained according to Q second pre-coding matrices in the second pre-coding matrix set and according to the third pre-coding matrix set, where a first pre-coding matrix set is obtained from each second pre-coding matrix and the third pre-coding matrix set. And one of the Q first pre-coding matrix sets is selected as per a preset criterion, where Q is an integer more than or equal to 1.

It shall be appreciated that the rank of a first pre-coding matrix in the first pre-coding matrix set can be determined according to the number of downlink transmission layers, so that the second pre-coding matrix and the third pre-coding matrix set for obtaining the first pre-coding matrix set as a result of operation can be determined under a preset operational rule, although a detailed description thereof is omitted here.

In an implementation, the terminal can select one of the Q first pre-coding matrix sets as per the preset criterion in the same process as the process of selecting one of the plurality of first pre-coding matrix sets in the first scheme: the terminal can assume that physical resources in the first sub-band are pre-coded by using each of the Q first pre-coding matrix sets, respectively, and then select one of the Q first pre-coding matrix sets by comparing physical quantities such as channel capacities, transport block sizes, or SINRs, which are calculated by using the Q different first pre-coding matrix sets. In an implementation, different first pre-coding matrices in a first pre-coding matrix set are assumed to be pre-coding matrices for transmitting data symbols over the different physical resources in the first sub-band, so that the corresponding physical quantities are measured, and a measured physical quantity corresponding to the first pre-coding matrix set is further obtained.

In some embodiments of the disclosure, the first pre-coding matrix set can be obtained according to the second pre-coding matrix and according to the third pre-coding matrix set as follows.

A second pre-coding matrix is selected from the second pre-coding matrix set as per a preset criterion, and a first pre-coding matrix set in the first sub-band corresponding to the number of downlink transmission layers is obtained according to both the selected second pre-coding matrix and the third pre-coding matrix set.

In an implementation, the terminal can firstly select a second pre-coding matrix from the second pre-coding matrix set based upon downlink channel information, so that it performs an operation on both the selected second pre-coding matrix and the third pre-coding matrix set to obtain a first pre-coding matrix set. When selecting the second pre-coding matrix, the terminal can assume that physical resources in the first sub-band are pre-coded by using each of the second pre-coding matrices in the second pre-coding matrix set, respectively, and then select one of the second pre-coding matrices by comparing physical quantities such as channel capacities, transport block sizes, or SINRs, which are calculated by using the different second pre-coding matrices.

In some embodiments of the disclosure, after the terminal obtains the first pre-coding matrix set in the first sub-band corresponding to the number of downlink transmission layers at the operation 301, the terminal can further arrange column vectors in each of the first pre-coding matrices in the obtained first pre-coding matrix set according to column vector arrangement patterns corresponding to the pre-coding matrices to obtain a fifth pre-coding matrix set in the first sub-band, and subsequently determine a CQI in the second sub-band according to downlink channel information and according to the fifth pre-coding matrix set in the first sub-band.

As can be apparent, the fifth pre-coding matrix set includes the first pre-coding matrices in the first pre-coding matrix set, and includes the pre-coding matrices obtained by arranging the column vectors in the first pre-coding matrices in the first pre-coding matrix set according to the column vector arrangement patterns corresponding to the pre-coding matrices, where the column vector arrangement patterns can be agreed on in advance between the base station and the terminal.

For example, if a first pre-coding matrix in the first pre-coding matrix set obtained in the operation 301 includes four column vectors, and an initial column vector arrangement pattern is {1, 2, 3, 4}, then the fifth pre-coding matrix set obtained by arranging the column vectors further includes pre-coding matrices obtained by arranging the column vectors in the first pre-coding matrix according to three column vector arrangement patterns, i.e., {2, 3, 4, 1}, {3, 4, 1, 2}, and {4, 1, 2, 3}. Common column vector arrangement patterns further include {1, 2, 3, 4}, {2, 1, 4, 3}, {3, 4, 1, 2}, {4, 3, 2, 1}, and etc.

At the operation 302, the terminal determines the CQI in the second sub-band according to downlink channel information and according to the first pre-coding matrix set in the first sub-band.

In an implementation, the terminal determines first pre-coding matrices corresponding to physical resources in the second sub-band according to the first pre-coding matrices in the first pre-coding matrix set corresponding to the physical resources in the first sub-band, and further determines the CQI in the second sub-hand according to the second pre-coding matrices corresponding to the physical resources in the second sub-band. In an implementation, the terminal can determine the CQI in the second sub-band according to the second pre-coding matrices corresponding to the physical resources in the second sub-band as follows: the terminal assumes that physical resources in the second sub-band are pre-coded by using each of the second pre-coding matrices corresponding to each of the physical resources in the second-band, respectively, and then determines the CQI in the second sub-band.

In an implementation, since the second sub-band includes one or more first sub-bands, if the second sub-band includes only one first sub-band, and for example, both the second sub-band and the first sub-band are a system bandwidth, then the terminal assumes the different pre-coding matrices in the first pre-coding matrix set in the first sub-band as second pre-coding matrices for transmitting data symbols over the different physical resources in the second sub-band, calculates equivalent SINRs over the respective physical resources in the second sub-band according to downlink channel information of the respective physical resources, and calculate the CQI in the second sub-band after obtaining the equivalent SINRs over the respective physical resources in the second sub-band.

If the second sub-band includes a plurality of first sub-bands, then the terminal obtains a first pre-coding matrix set for each first sub-band in the second sub-band, where the first pre-coding matrix set for each first sub-band can be obtained in the same way. The terminal then assumes, for each first sub-band, pre-coding matrices in the corresponding first pre-coding matrix set as pre-coding matrices for transmitting data symbols over different physical resources in the respective first sub-band, and then calculates equivalent SINRs over the respective physical resources in the respective first sub-band according to downlink channel information of the respective physical resources and the assumption of the pre-coding matrices, so that the terminal can calculate the CQI in the second sub-band after obtaining the equivalent SINRs over the respective physical resources in the second sub-band.

At the operation 303, the terminal provides feedback of CSI including one or more of an RI indicating the number of downlink transmission layers, indication information of the first pre-coding matrix set in the first sub-band, and the CQI in the second sub-band.

In an implementation, the CSI led back by the terminal can be configured by the base station. For example, the base station can configure the terminal to report only the CQI, or only the RI and the CQI, or report the RI, the PMI, and the CQI.

The terminal can feed back the indication information of the first pre-coding matrix set in the first sub-band in a number of feedback schemes. Several feedback schemes will be described below respectively for two cases in which the first pre-coding matrix set in the first sub-band is obtained in the first scheme and in the second scheme of the operation 301.

In a first case, the first pre-coding matrix set in the first sub-band is obtained in the first scheme of the operation 301.

In this case, an indicating scheme for indicating the first pre-coding matrix set in the first sub-band can include but is not limited to the following indicating schemes.

In a first indicating scheme, indication information of the first pre-coding matrix set in the first sub-band includes a first PMI, where the first MI is an index of a first vector group in the preset vector group set, and the first pre-coding matrix set is obtained based upon the first vector group.

In an implementation, the terminal determines the index, of a vector group for obtaining the first pre-coding matrix set, in the preset vector group set as the indication information of the first pre-coding matrix set, i.e., the first PMI.

In some embodiments of the disclosure, the index of a vector group in the preset vector group set can be the index, of the first column vector in the vector group. For example, if the preset vector group set is $\{V_1, V_2, \ldots, V_d, \ldots V_D\}$, and the first vector in the i-th vector group in the vector group set is $V_{i1}=V_d$, then an index corresponding to the i-th vector group is d.

In a second indicating scheme, indication information of the first pre-coding matrix set in the first sub-band includes a first PMI and a second PMI, where the first PMI is the index of a vector group subset in the preset vector group set, the second PMI is an index of a first vector group in the vector group subset indicated by the first PMI, and the first pre-coding matrix set is obtained based upon the first vector group.

In an implementation, a correspondence relationship between a vector group subset and a first PMI, and a correspondence relationship between a vector group and a second PMI can be agreed on in advance between the base station and the UE. By way of an example, there are 32 vector groups in the vector group set, and each vector group subset includes four different vector groups, then there are eight subsets of vector groups in total, where the values of the first PMI and the second PMI range from 0 to 7 and 0 to 3 respectively.

In some embodiments of the disclosure, the second PMI can be the index, of the vector group for obtaining the first pre-coding matrix set, in a vector group subset recently fed back by the terminal for one or more times. For example, the second PMI can be the index, of the vector group for obtaining the first pre-coding matrix set, in a vector group subset recently fed back by the terminal once.

In a third indicating scheme, indication information of the first pre-coding matrix set in the first sub-band includes a first PMI, where the first PMI is the index of the first pre-coding matrix set in a first codebook, and the first codebook includes multiple first pre-coding matrix sets obtained according to both the preset vector group set and phase set.

In some embodiments of the disclosure, the terminal can determine the index of the first pre-coding matrix set in the first codebook agreed on between the terminal and the base station, as the indication information according to the first codebook. For example, if the first codebook includes four first pre-coding matrix sets, then the indication information may include two bits to indicate the four sets respectively.

In a fourth indicating scheme, indication information of the first pre-coding matrix set in the first sub-band includes a first PMI and a second PMI, where the first PMI is the index of a fourth pre-coding matrix set in a first codebook, the second PMI is an index of the first pre-coding matrix set in the fourth pre-coding matrix set, the first codebook includes multiple first pre-coding matrix sets obtained according to the preset vector group set, and according to phase set, and the fourth pre-coding matrix set includes one or more first pre-coding matrix sets, and is a subset of the first codebook.

In an implementation, the fourth pre-coding matrix set can be a set of matrices in the first codebook, and include multiple first pre-coding matrix sets in the first codebook. By way of an example, if there are sixteenth first pre-coding matrix sets, and each fourth pre-coding matrix set includes four first pre-coding matrix sets, where the last two first pre-coding matrix sets in a fourth pre-coding matrix set are the same as the first two sets of pre-coding matrices in the next fourth pre-coding matrix set, then there are eight sets of fourth pre-coding matrices in a fourth pre-coding matrix set, where the values of the first nil and the second PMI range from 0 to 7 and 0 to 3 respectively.

A correspondence relationship between a fourth pre-coding matrix set and a first PMI, and a correspondence relationship between a first pre-coding matrix set and a second PMI can be agreed on between the base station and the terminal.

In some embodiments of the disclosure, the second PMI is an index, of the first pre-coding matrix set, in a fourth vector group subset recently fed back by the terminal for one or more times.

In a second case, the first pre-coding matrix set in the first sub-band is obtained in the second scheme of the operation 301.

In this case, an indicating scheme for indicating the first pre-coding matrix set in the first sub-band can include but is not limited to the following indicating schemes.

In a first indicating scheme, indication information of the first pre-coding matrix set in the first sub-band includes a first PMI, where the first PMI is the index of a second pre-coding ilk matrix in the second pre-coding matrix set, and the first pre-coding matrix set is obtained based upon the second pre-coding matrix.

In a second indicating scheme, indication information of the first pre-coding matrix set in the first sub-band includes a first PIM and a second PMI, where the first PMI is the index of a second pre-coding matrix subset in the second pre-coding matrix set, the second PMI is an index of the second pre-coding matrix in the second pre-coding matrix subset indicated by the first PMI, and the first pre-coding matrix set is obtained based upon the second pre-coding matrix.

In an implementation, a correspondence relationship between a second pre-coding matrix and a first PMI, and a correspondence relationship between a second pre-coding matrix and a second PMI can be agreed on in advance between the base station and the UE. By way of an example, if each second pre-coding matrix subset includes four second pre-coding matrices, and there are four subsets of second pre-coding matrices in total, then the values of the first PMI and the second PMI range from 0 to 3.

In some embodiments of the disclosure, the second PMI can be the index, of the second pre-coding matrix for obtaining the first pre-coding matrix set, in a second pre-coding matrix subset recently fed back by the terminal for one or more times.

In a third indicating scheme, indication information of the first pre-coding matrix set in the first sub-band includes a first PMI, where the first PMI is the index of the first pre-coding matrix set in a first codebook, and the first codebook includes multiple first pre-coding matrix sets obtained according to the second pre-coding matrix set, and according to the third pre-coding matrix set, and a first pre-coding matrix set is obtained from each second pre-coding matrix in the second pre-coding matrix set and from the third pre-coding matrix set.

In a fourth indicating scheme, indication information of the first pre-coding matrix set in the first sub-band includes a first PMI and a second PMI, where the first PMI is the index of a fourth pre-coding matrix set in a first codebook, the second PMI is an index of the first pre-coding matrix set in the fourth pre-coding matrix set, the first codebook includes multiple first pre-coding matrix sets obtained according to the second pre-coding matrix set and according to the third pre-coding matrix set, and the fourth pre-coding matrix set includes one or more first pre-coding matrix sets, and is a subset of the first codebook.

In the two schemes as described above in which the terminal feeds back two PMIs, the first PMI is long-time wideband information, is generally fed back for a wideband, and is reported at a long periodicity; and the second PMI is short-time sub-band information, can be fed back for a sub-band, and can be reported at a shorter periodicity than the first PMI.

In some embodiments of the disclosure, if the second sub-band is the system bandwidth, and the second sub-band includes a plurality of first sub-bands, then the terminal may feed back indication information of a first pre-coding matrix set in each first sub-band respectively, or select one of the first sub-bands, and feed both the index of the first sub-band and indication information of a first pre-coding matrix set in the first sub-band back to the base station. For example, the terminal can select a first sub-band having the highest channel quality according to assumption based on a first pre-coding matrix set for providing feedback.

In summary, in the method for providing feedback of CSI according to the embodiments of the disclosure, the terminal determines for the sub-band the set of pre-coding matrices in the sub-band, determines the plurality of pre-coding matrices in the set as pre-coding matrices over the different physical resources in the sub-band, measures a CQI, and feeds back the corresponding CSI.

As can be apparent, in the method for providing feedback of CSI according to the embodiment of the disclosure, the terminal only needs to report the index of the first pre-coding matrix set instead of a pre-coding matrix really applied over each physical resource, so the overhead of feedback signaling can be lowered as compared with the existing closed-loop transmission; and the terminal measures CSI based upon the first pre-coding matrix set, so that the extent of matching the CSI with a channel state can be improved over the existing technology in which CSI is measured based upon only one pre-coding matrix. Furthermore, the terminal reports an index corresponding to a beam in use, so that the base station performing downlink pre-coding can be provided with a gain of beam-forming, and a gain of pre-coding, thus resulting in a performance advantage over the existing open-loop transmission.

Also in the method for providing feedback of CSI according to the embodiments of the disclosure, the terminal pre-codes data over different physical resources using different pre-coding matrices, so that the gain of pre-coding, and the CQI can be alleviated from being affected by a changing channel, thereby making the channel information measured more accurately, and guaranteeing the gain of pre-coding so as to improve the performance of detection. In an implementation, in the scenario of mobility at a high speed, the technical solution according to the embodiments of the disclosure can improve the performance significantly over the traditional AMMO transmission solution. Accordingly the method for providing feedback of CSI according to the embodiments of the disclosure can lower the feedback overhead, while also guarantee the performance in the scenario of mobility at a high speed.

In order to make the method for providing feedback of CSI according to the embodiments of the disclosure more apparent, an application of the method for providing feedback of CSI according to the embodiments of the disclosure will be set forth below by way of an example in connection with the flow of the method as illustrated in FIG. 3.

In a first example, the number of downlink transmission layers is Rank=2, and a vector group in the vector group set is where a vector is $\{v_m, v_{m'}\}$, where a vector is $v_m = [1 \ e^{j2\pi m/32} \ e^{j4\pi m/32} \ e^{j6\pi m/32}]^T$, and a phase factor is $\varphi_n = e^{j\pi n}$ (n=0, 1), so a phase matrix $$\begin{bmatrix} 1 & 1 \\ \varphi_n & -\varphi_n \end{bmatrix}$$

is obtained by using the phase factor. Since n=0, 1, the number of phase matrices is two, and the phase matrices are $$\begin{bmatrix} 1 & 1 \\ \varphi_0 & -\varphi_0 \end{bmatrix} \text{ and } \begin{bmatrix} 1 & 1 \\ \varphi_1 & -\varphi_1 \end{bmatrix}$$

respectively.

A first pre-coding matrix set corresponding to the vector group $\{v_m, v_{m'}\}$ can be obtained as follows: an operation is performed respectively on a vector $v_m = [1 \ e^{j2\pi m/32} \ e^{j4\pi m/32} \ e^{j6\pi m/32}]^T$ in the vector group $\{v_m, v_{m'}\}$ and each of the two phase matrices to obtain two pre-coding matrices represented as $$W_{m,n}^{(2)} = \frac{1}{4}\begin{bmatrix} v_m & v_m \\ \varphi_n v_m & -\varphi_n v_m \end{bmatrix}$$

(where n=0, 1), and these two pre-coding matrices constitute a first pre-coding matrix set.

A first indicating scheme 1 of the first pre-coding matrix set: the first pre-coding matrix set can be indicated by a first PMI, which is the index, of the vector group $\{v_m, v_{m'}\}$ for obtaining the first pre-coding matrix set, in the vector group set.

A second indicating scheme 1 of the first pre-coding matrix set: the first pre-coding matrix set can be indicated by a first PMI (i1 in Table 1) and a second PMI (i2 in Table 1), that is, both i1 and i2 indicate a first pre-coding matrix set, where i1 is the index, of a subset in the first codebook, in the first codebook (a subset includes four first pre-coding matrix sets), and i2 is the index of the first pre-coding matrix set in the subset indicated by i1.

For a first pre-coding matrix set, the index of a pre-coding matrix thereof in the set is a third index (i3 in Table 1).

performed respectively on a vector $v_m = [1 \; e^{j2\pi m/32} \; e^{j4\pi m/32} \; e^{j6\pi m/32}]^T$ in the vector group $\{v_m, v_{m'}\}$ and each of the two phase matrices to obtain two pre-coding matrices represented as $$W_{m,n}^{(2)} = \frac{1}{4}\begin{bmatrix} v_m & v_m \\ \varphi_n v_m & -\varphi_n v_m \end{bmatrix}$$

(where n=0, 1), and these two pre-coding matrices constitute a first pre-coding matrix set.

The first pre-coding matrix set can be indicated by a first PMI, which is the index, of the vector group $\{v_m, v_{m'}\}$ for obtaining the first pre-coding matrix set, in the vector group set.

For a first pre-coding matrix set, the index of a pre-coding matrix thereof in the set is a third index (i3 in Table 2).

TABLE 1

| The number of downlink transmission layers, i.e., Rank = 2 | | | | | | | | |
|---|---|---|---|---|---|---|---|---|
| | | | | $i_2$ | | | | |
| | 0 | | 1 | | 2 | | 3 | |
| | $i_3$ | | $i_3$ | | $i_3$ | | $i_3$ | |
| $i_1$ | 0 | 1 | 0 | 1 | 0 | 1 | 0 | 1 |
| 0-15 | $W_{2i_2,0}^{(2)}$ | $W_{2i_2,1}^{(2)}$ | $W_{2i_2+1,0}^{(2)}$ | $W_{2i_2+1,1}^{(2)}$ | $W_{2i_2+2,0}^{(2)}$ | $W_{2i_2+2,1}^{(2)}$ | $W_{2i_2+3,0}^{(2)}$ | $W_{2i_2+3,1}^{(2)}$ | where $W_{m,n}^{(2)} = \frac{1}{4}\begin{bmatrix} v_m & v_m \\ \varphi_n v_m & -\varphi_n v_m \end{bmatrix}$, $\varphi_n = e^{j\pi n}$ and $v_m = [1 \; e^{j2\pi m/32} \; e^{j4\pi m/32} \; e^{j6\pi m/32}]^T$.

In a second example, the number of downlink transmission layers is Rank=2, and a vector group in the vector group set is $\{v_m, v_{m'}\}$, where a vector is $v_m = [1 \; e^{j2\pi m/32} \; e^{j4\pi m/32} \; e^{j6\pi m/32}]^T$, and a phase factor is $\varphi_n = e^{j\pi n}$ (n=0,1), so a phase matrix $$\begin{bmatrix} 1 & 1 \\ \varphi_n & -\varphi_n \end{bmatrix}$$

is obtained using the phase factor; and since n=0,1, the number of phase matrices is two, and the phase matrices are $$\begin{bmatrix} 1 & 1 \\ \varphi_0 & -\varphi_0 \end{bmatrix} \text{ and } \begin{bmatrix} 1 & 1 \\ \varphi_1 & -\varphi_1 \end{bmatrix}$$

respectively.

A first pre-coding matrix set corresponding to the vector group $\{v_m, v_{m'}\}$ can be obtained as follows: an operation is

TABLE 2

| The number of downlink transmission layers, i.e., Rank = 2 | | |
|---|---|---|
| | $i_3$ | |
| $i_1$ | 0 | 1 |
| 0-31 | $W_{i_1,0}^{(2)}$ | $W_{i_1,1}^{(2)}$ | where $W_{m,n}^{(2)} = \frac{1}{4}\begin{bmatrix} v_m & v_m \\ \varphi_n v_m & -\varphi_n v_m \end{bmatrix}$, $\varphi_n = e^{j\pi n}$ and $v_m = [1 \; e^{j2\pi m/32} \; e^{j4\pi m/32} \; e^{j6\pi m/32}]^T$.

In a third example, the number of downlink transmission layers is Rank=2, and a vector group in the vector group set is $\{v_m, v_{m'}\}$, where a vector is $v_m = [1 \; e^{j2\pi m/32} \; e^{j4\pi m/32} \; e^{j6\pi m/32}]^T$, the number of phase matrices is two, and the phase matrices are $$\begin{bmatrix} 1 & 1 \\ 1 & -1 \end{bmatrix} \text{ and } \begin{bmatrix} 1 & 1 \\ -1 & 1 \end{bmatrix}$$

respectively.

A first pre-coding matrix set corresponding to the vector group $\{v_m, v_{m'}\}$ can be obtained as follows: An operation is performed respectively on a vector $v_m=[1 \ e^{j2\pi m/32} \ e^{j4\pi m/32} \ e^{j6\pi m/32}]^T$ in the vector group $\{v_m, v_{m'}\}$ and each of the two phase matrices to obtain two pre-coding matrices represented as $$\frac{1}{4}\begin{bmatrix} v_i & v_i \\ v_i & -v_i \end{bmatrix} \text{ and } \frac{1}{4}\begin{bmatrix} v_i & v_i \\ -v_i & v_i \end{bmatrix},$$

and these two pre-coding matrices constitute a first pre-coding matrix set.

The first pre-coding matrix set can be indicated by a first PMI, which is the index, of the vector group $\{v_m, v_{m'}\}$ for obtaining the first pre-coding matrix set, in the vector group set.

For a first pre-coding matrix set, the index of a pre-coding matrix thereof in the set is a third index (i3 in Table 3).

TABLE 3

| | The number of downlink transmission layers, i.e., Rank = 2 | |
|---|---|---|
| | i₃ | |
| i₁ | 0 | 1 |
| 0-31 | $\frac{1}{4}\begin{bmatrix} v_i & v_i \\ v_i & -v_i \end{bmatrix}$ | $\frac{1}{4}\begin{bmatrix} v_i & v_i \\ -v_i & v_i \end{bmatrix}$ |
| | $v_m = [\ 1 \ \ e^{j2\pi m/32} \ \ e^{j4\pi m/32} \ \ e^{j6\pi m/32} \ ]^T$ | |

In a fourth example, the number of downlink transmission layers is Rank=4, a second pre-coding matrix in the second pre-coding matrix set is $$\begin{bmatrix} v_m & 0 & v_{m+8} & 0 \\ 0 & v_m & 0 & v_{m+8} \end{bmatrix},$$

and the third pre-coding matrix set is $Z_n$.

$Z_n$ is selected from a predefined set of matrices, e.g.:

| $Z_n$ | $Z_n$ |
|---|---|
| $\begin{bmatrix} 1 & 1 & 0 & 0 \\ 1 & -1 & 0 & 0 \\ 0 & 0 & 1 & 1 \\ 0 & 0 & 1 & -1 \end{bmatrix}$ | $\begin{bmatrix} 0 & 0 & 1 & 1 \\ 0 & 0 & 1 & -1 \\ 1 & 1 & 0 & 0 \\ 1 & -1 & 0 & 0 \end{bmatrix}$ |
| $\begin{bmatrix} 1 & 1 & 0 & 0 \\ -1 & 1 & 0 & 0 \\ 0 & 0 & 1 & 1 \\ 0 & 0 & -1 & 1 \end{bmatrix}$ | $\begin{bmatrix} 0 & 0 & 1 & 1 \\ 0 & 0 & -1 & 1 \\ 1 & 1 & 0 & 0 \\ -1 & 1 & 0 & 0 \end{bmatrix}$ |

A first pre-coding matrix set corresponding to the second pre-coding matrix $$\begin{bmatrix} v_m & 0 & v_{m+8} & 0 \\ 0 & v_m & 0 & v_{m+8} \end{bmatrix}$$

can be obtained as a result of calculation operation based on both the second pre-coding matrix and the third pre-coding matrix set $Z_n$ in the equation of $$\begin{bmatrix} v_m & 0 & v_{m+8} & 0 \\ 0 & v_m & 0 & v_{m+8} \end{bmatrix} \times Z_n.$$

The first pre-coding matrix set can be indicated by a first PMI, which is the index, of the second pre-coding matrix $$\begin{bmatrix} v_m & 0 & v_{m+8} & 0 \\ 0 & v_m & 0 & v_{m+8} \end{bmatrix}$$

for obtaining the first pre-coding matrix set, in the second pre-coding matrix set.

For a first pre-coding matrix set, the index of a pre-coding matrix thereof in the set is a third index (i3 in Table 4), where i3 is also the index, of the third pre-coding matrix for obtaining the first pre-coding matrix set, in the third pre-coding matrix set $Z_n$.

TABLE 4

| | The number of downlink transmission layers, i.e., Rank = 4 | | | |
|---|---|---|---|---|
| | i₃ | | | |
| i₁ | 0 | 1 | 2 | 3 |
| 0-31 | $W_{i_1,0}^{(2)}$ | $W_{i_1,1}^{(2)}$ | $W_{i_1,2}^{(2)}$ | $W_{i_1,3}^{(2)}$ |
| where $W_{m,n}^{(4)} = \frac{1}{\sqrt{32}}\begin{bmatrix} v_m & 0 & v_{m+8} & 0 \\ 0 & v_m & 0 & v_{m+8} \end{bmatrix} \times Z_n,$ | | | | |
| $v_m = [\ 1 \ \ e^{j2\pi m/32} \ \ e^{j4\pi m/32} \ \ e^{j6\pi m/32}\ ]^T$ | | | | |

In a fifth example, the number of downlink transmission layers is Rank=4, a second pre-coding matrix in the second pre-coding matrix set is $$\begin{bmatrix} v_m & 0 & v_{m+8} & 0 \\ 0 & v_m & 0 & v_{m+8} \end{bmatrix},$$

and the third pre-coding matrix set is $Z_n$.

$Z_n$ is selected from a predefined set of matrices, e.g.:

| $Z_n$ |
|---|
| $\begin{bmatrix} 1 & 1 \\ 1 & -1 \end{bmatrix}$ |
| $\begin{bmatrix} 1 & 1 \\ -1 & 1 \end{bmatrix}$ |

A first pre-coding matrix set corresponding to the second pre-coding matrix $$\begin{bmatrix} v_m & 0 & v_{m+8} & 0 \\ 0 & v_m & 0 & v_{m+8} \end{bmatrix}$$

can be obtained as a result of calculation operation based on both the second pre-coding matrix and the third pre-coding matrix set $Z_n$ in the equation of $Z_n \times$ $$\begin{bmatrix} v_m & 0 & v_{m+16} & 0 \\ 0 & v_m & 0 & v_{m+24} \end{bmatrix}.$$

The first pre-coding matrix set can be indicated by a first PMI, which is the index, of the second pre-coding matrix $$\begin{bmatrix} v_m & 0 & v_{m+8} & 0 \\ 0 & v_m & 0 & v_{m+8} \end{bmatrix}$$

for obtaining the first pre-coding matrix set, in the second pre-coding matrix set.

For a first pre-coding matrix set, the index of a pre-coding matrix thereof in the set is a third index (i3 in Table 5), where i3 is also the index, of the third pre-coding matrix for obtaining the first pre-coding matrix set, in the third pre-coding matrix set $Z_n$.

TABLE 5

The number of downlink transmission layers, i.e., Rank = 4

| | $i_3$ | |
|---|---|---|
| $i_1$ | 0 | 1 |
| 0-32 | $W_{i_1,0}^{(2)}$ | $W_{i_1,1}^{(2)}$ | where $W_{m,n}^{(4)} = \frac{1}{\sqrt{32}} Z_n \begin{bmatrix} v_m & 0 & v_{m+16} & 0 \\ 0 & v_m & 0 & v_{m+24} \end{bmatrix}$, $v_m = [\ 1\ \ e^{j2\pi m/32}\ \ e^{j4\pi m/32}\ \ e^{j6\pi m/32}\ ]^T$ In a sixth example, the number of downlink transmission layers is Rank=4, a second pre-coding matrix in the second pre-coding matrix set is $[v_m\ v_{m+8}]$, and the third pre-coding matrix set is $Z_n$.

$Z_n$ is selected from a predefined set of matrices, e.g.:

| $Z_n$ |
|---|
| $\begin{bmatrix} 1 & 1 \\ 1 & -1 \end{bmatrix}$ |
| $\begin{bmatrix} 1 & 1 \\ -1 & 1 \end{bmatrix}$ |

A first pre-coding, matrix set corresponding to the second pre-coding matrix $[v_m\ v_{m+8}]$ can be obtained as a result of calculation operation based on both the second pre-coding matrix and the third pre-coding matrix set $Z_n$ in the equation of $[v_m\ v_{m+8}] \otimes Z_n$.

The first pre-coding matrix set can be indicated by a first PMI, which is the index, of the second pre-coding matrix $[v_m\ v_{m+8}]$ for obtaining the first pre-coding matrix set, in the second pre-coding matrix set.

For a first pre-coding matrix set, the index of a pre-coding matrix thereof in the set is a third index (i3 in Table 6), where i3 is also the index, of the third pre-coding matrix for obtaining the first pre-coding matrix set, in the third pre-coding matrix set $Z_n$.

TABLE 6

The number of downlink transmission layers. i.e., Rank = 4

| | $i_3$ | |
|---|---|---|
| $i_1$ | 0 | 1 |
| 0-31 | $W_{i_1,0}^{(2)}$ | $W_{i_1,1}^{(2)}$ | where $W_{m,n}^{(4)} = \frac{1}{\sqrt{32}} [\ v_m\ \ v_{m+8}\ ] \otimes Z_n$, $v_m = [\ 1\ \ e^{j2\pi m/32}\ \ e^{j4\pi m/32}\ \ e^{j6\pi m/32}\ ]^T$ A further embodiment of the disclosure provides a pre-coding method.

Figure 4:
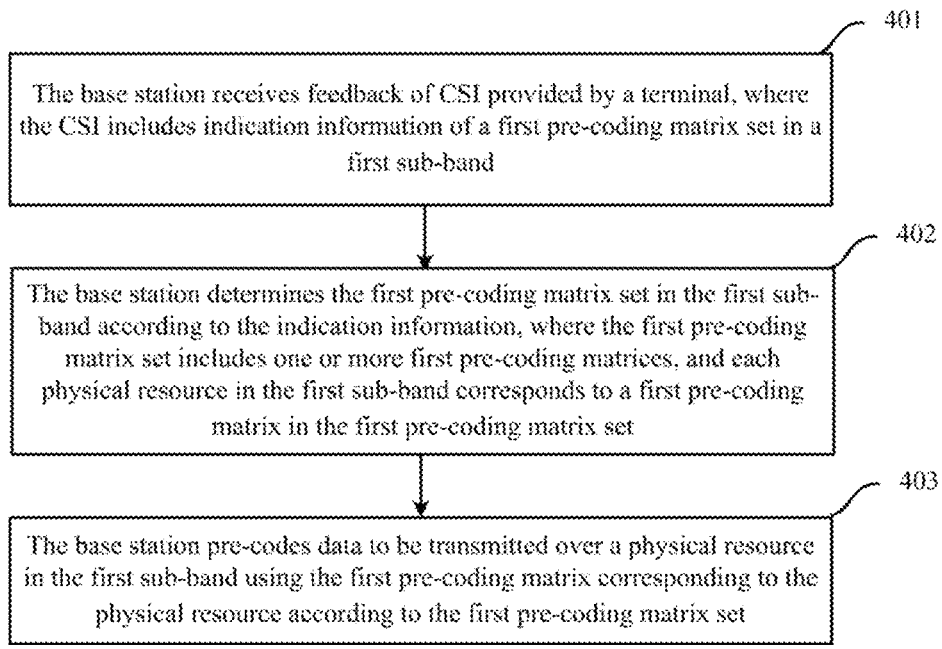
FIG. 4 is a schematic flow chart of pre-coding process according to an embodiment of the disclosure.

FIG. 4 illustrates a schematic flow chart of a pre-coding method according to another embodiment of the disclosure, and the flow can be performed by a base station. The flow includes the following operations 410-403.

In the operation 401, the base station receives feedback of CSI provided by a terminal, where the CSI includes indication information of a first pre-coding matrix set in a first sub-band.

In the operation 402, the base station determines the first pre-coding matrix set in the first sub-band according to the indication information, where the first pre-coding matrix set includes one or more first pre-coding matrices, and each physical resource in the first sub-band corresponds to a first pre-coding matrix in the first pre-coding matrix set.

In the operation 403, the base station pre-codes data to be transmitted over a physical resource in the first sub-band using the first pre-coding matrix corresponding to the physical resource according to the first pre-coding matrix set.

In an implementation, the terminal can measure a CQI and feed back the CSI in the same way as described in the embodiments above of the method at the terminal side, so a repeated description thereof is omitted here. Of course, the terminal can also measure a CQI and feed back the CSI in another way.

The first sub-band and the second sub-band can be defined, and a vector group can be defined and arranged as described in the embodiments above, so a repeated description thereof is omitted here.

The base station can determine the first pre-coding matrix set in the first sub-band differently according to the different indication information of the first pre-coding matrix set in the first sub-band, fed back by the terminal in the embodiments above of the method at the terminal side. For an implementation in which the terminal determines the first pre-coding matrix set, reference can be made to the description of the operations in the embodiments above of the method for providing feedback of CSI at the terminal side.

Furthermore, a correspondence relationship between a physical resource in the first sub-band and a first pre-coding matrix in the first pre-coding matrix set, and a definition of physical resources in the first sub-band, can also be defined in substantially the same way as in the flow of the embodiment above, so a repeated description thereof is omitted here.

Based upon the same technical idea, an embodiment of the disclosure further provides a terminal.

Figure 5:
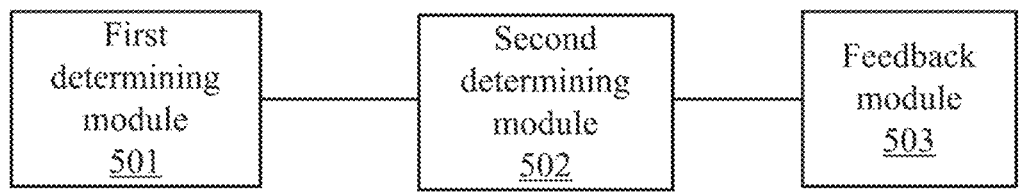
FIG. 5 is a schematic structural diagram of a terminal according to an embodiment of the disclosure.

Referring to FIG. 5 which is a schematic structural diagram of a terminal according to an embodiment of the disclosure, the terminal can perform the flow above of providing feedback of CSI at the terminal side.

As illustrated in FIG. 5, a terminal according to an embodiment of the disclosure includes: a first determining module 501 configured to obtain a first pre-coding matrix set in a first sub-band corresponding to the number of downlink transmission layers according to the number of downlink transmission layers, where the first pre-coding matrix set comprises one or more first pre-coding matrices and each physical resource in the first sub-band corresponds to one of the one or more first pre-coding matrices in the first pre-coding matrix set a second determining module 502 configured to determine a CQI in a second sub-band according to downlink channel information and according to the first pre-coding matrix set in the first sub-band; and a feedback module configured to provide feedback of the CSI, where the CSI comprises one or more of: an RI indicating the number of downlink transmission layers, indication information of the first pre-coding matrix set in the first sub-band, and the CQI in the second sub-band.

In an implementation, the terminal as illustrated in FIG. 5 can perform the embodiments above of the method at the terminal side, and for a particular implementation thereof, reference can be made to the embodiments above of the method at the terminal side, so a repeated description thereof is omitted here.

The first sub-band and the second sub-band can be defined, and a vector group can be defined and arranged as described in the embodiments above, so a repeated description thereof is omitted here.

Based upon the same technical idea, an embodiment of the disclosure further provides a base station.

Figure 6:
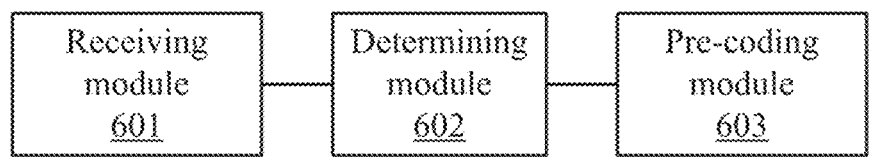
FIG. 6 is a schematic structural diagram of a base station according to an embodiment of the disclosure.

Referring to FIG. 6 which is a schematic structural diagram of a base station according to an embodiment of the disclosure, the base station can perform the flow above of pre-coding at the base station side.

As illustrated in FIG. 6, a base station according to an embodiment of the disclosure includes: a receiving module 601 configured to receive feedback of CSI provided by a terminal, where the CSI comprises indication information of a first pre-coding matrix set in a first sub-band; a determining module 602 configured to determine the first pre-coding matrix set in the first sub-band according to the indication information, where the first pre-coding matrix set comprises one or more first pre-coding matrices, and each physical resource in the first sub-band corresponds to a first pre-coding matrix in the first pre-coding matrix set; and a pre-coding module 603 configured to pre-code data to be transmitted over a physical resource in the first sub-band using the first pre-coding matrix corresponding to the physical resource according to the first pre-coding matrix set.

In an implementation, the base station as illustrated in FIG. 6 can perform the embodiments above of the method at the base station side, and for a particular implementation thereof, reference can be made to the embodiments above of the method at the base station side, so a repeated description thereof is omitted here.

Here the first sub-band and the second sub-band can be defined, and a vector group can be defined and arranged as described in the embodiments above, so a repeated description thereof is omitted here. A correspondence relationship between a physical resource in the first sub-band and a first pre-coding matrix in the first pre-coding matrix set, and a definition of physical resources in the first sub-band, can also be defined in substantially the same way as in the flow of the embodiment above, so a repeated description thereof is omitted here.

Based upon the same technical idea, another embodiment of the disclosure further provides a terminal, and the terminal can perform the flow above of providing feedback of CSI at the terminal side.

Figure 7:
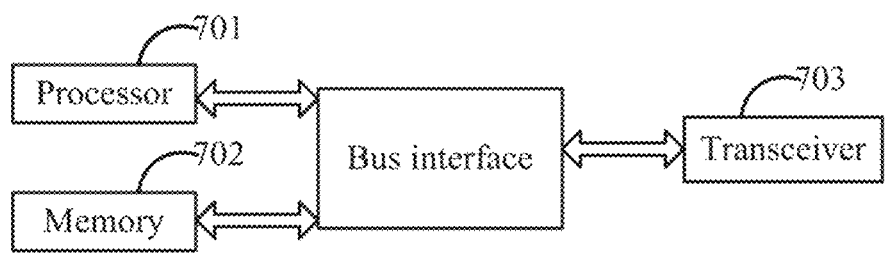
FIG. 7 is a schematic structural diagram of a terminal according to another embodiment ilk of the disclosure.

Referring to FIG. 7 which is a schematic structural diagram of a terminal according to an embodiment of the disclosure. The terminal can perform the flow above of providing feedback of CSI at the terminal side. As illustrated, the terminal can include a processor 701, a memory 702, a communication module 703, and a bus interface.

The processor 701 is responsible for managing bus architecture and performing normal processes, and the memory 702 can store data for use by the processor 701 in performing operations. The communication module 703 is configured to be controlled by the processor 701 to receive and transmit data.

The bus architecture can include any number of interconnecting buses and bridges to in an implementation, link together various circuits including one or more processors represented by the processor 701, and one or more memories represented by the memory 702. The bus architecture can further link together various other circuits, e.g., a peripheral device, a manostat, a power management circuit, and etc., all of which are well known in the art, so a further description thereof is omitted in this context. The bus interface serves as an interface. The processor 701 is responsible for managing the bus architecture and performing normal processes, and the memory 702 can store data for use by the processor 701 in performing operations.

The flow according to the embodiment of the disclosure can be applied to the processor 701, or performed by the processor 701. In an implementation, the respective operations in the flow of processing a signal can be performed by integrated logic circuits in hardware, or instructions in software, in the processor 701. The processor 701 can be a general-purpose processor, a digital signal processor, an application specific integrated circuit, a field programmable gate array, or another programmable logic device, discrete gate, transistor logic device, or discrete hardware component. The respective methods, operations, and logic block diagrams disclosed in the embodiments of the disclosure can be implemented or performed. The general-purpose processor can be a micro processor, or can be any conventional processor, and etc. The operations in the method according to the embodiment of the disclosure can be performed directly by a hardware processor, or performed by a combination of hardware and software modules in the processor. The software module can be located in a random memory, a flash memory, a read-only memory, a programmable read-only memory, an electrically erasable and programmable memory, a register, or another storage medium known in the art. The storage medium is located in the memory 702, and the processor 701 reads the information in the memory 702, and performs the flow of providing feedback of CSI in combination with the hardware thereof.

The terminal as illustrated in FIG. 7 can perform the particular process as described in the embodiment above of the method for providing feedback of CSI at the terminal side through the processor 701, the memory 702, the communication module 703, and the bus interface thereof.

Based upon the same technical idea, another embodiment of the disclosure further provides a base station, and the base station can perform the flow above of pre-coding at the base station side.

Figure 8:
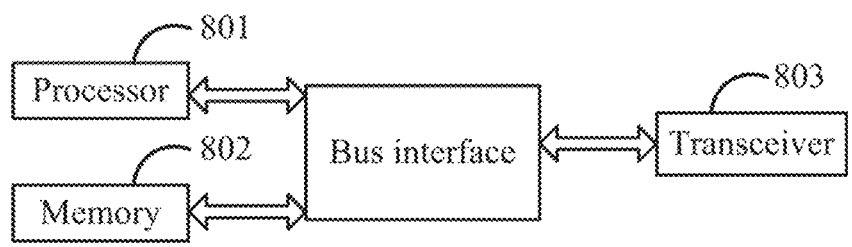
FIG. 8 is a schematic structural diagram of a base station according to another embodiment of the disclosure.

Referring to FIG. 8 which is a schematic structural diagram of a base station according to an embodiment of the disclosure. The base station can perform the flow above of pre-coding at the base station side. As illustrated, the base station can include a processor 801, a memory 802, a communication module 803, and a bus interface.

The processor 801 is responsible for managing bus architecture and performing normal processes, and the memory, 802 can store data for use by the processor 801 in performing operations. The communication module 803 is configured to be controlled by the processor 801 to receive and transmit data.

The bus architecture can include any number of interconnecting buses and bridges to in an implementation, link together various circuits including one or more processors represented by the processor 801, and one or more memories represented by the memory 802. The bus architecture can further link together various other circuits, e.g., a peripheral device, a manostat, a power management circuit, and etc., all of which are well known in the art, so a further description thereof will be omitted in this context. The bus interface serves as an interface. The processor 801 is responsible for managing the bus architecture and performing normal processes, and the memory 802 can store data for use by the processor 801 in performing operations.

The flow according to the embodiment of the disclosure can be applied to the processor 801, or performed by the processor 801. In an implementation, the respective operations in the flow of processing a signal can be performed by integrated logic circuits in hardware, or instructions in software, in the processor 801. The processor 801 can be a general-purpose processor, a digital signal processor, an application specific integrated circuit, a field programmable gate array, or another programmable logic device, discrete gate, transistor logic device, or discrete hardware component. The respective methods, operations, and logic block diagrams disclosed in the embodiments of the disclosure can be implemented or performed. The general-purpose processor can be a micro processor, or can be any conventional processor, and etc. The operations in the method according to the embodiment of the disclosure can be performed directly by a hardware processor, or performed by a combination of hardware and software modules in the processor. The software module can be located in a random memory, a flash memory, a read-only memory, a programmable read-only memory, an electrically erasable and programmable memory, a register, or another storage medium known in the art. The storage medium is located in the memory 802, and the processor 801 reads the information in the memory 802, and performs the flow of pre-coding in combination with the hardware thereof. The e base station as illustrated in FIG. 8 can perform the particular process as described in the embodiment above of the pre-coding method at the base station side through the processor 801, the memory 802, the communication module 803, and the bus interface thereof.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, and etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the blocks) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for providing feedback of Channel State Information (CSI), comprising:
   obtaining, by a terminal, a first pre-coding matrix set in a first sub-band corresponding to the number of downlink transmission layers according to the number of downlink transmission layers, wherein the first pre-coding matrix set comprises one or more first pre-coding matrices and each physical resource in the first sub-band corresponds to one of the one or more first pre-coding matrices in the first pre-coding matrix set;
   determining, by the terminal, a Channel Quality Indicator (CQI) in a second sub-band according to downlink channel information and according to the first pre-coding matrix set in the first sub-band; and
   providing, by the terminal, feedback of the CSI, wherein the CSI comprises one or more of: an rank indicator (RI) indicating the number of downlink transmission layers, indication information of the first pre-coding matrix set in the first sub-band, and the CQI in the second sub-band;

wherein the first pre-coding matrix set is obtained according to one or more vector groups in a preset vector group set, and according to one or more phase factors in a preset phase set; and wherein the vector group set comprises one or more vector groups, and one first pre-coding matrix set is obtained based upon one of the one or more vector groups in the preset vector group set and/or, the preset phase set comprises one or more phase factors, and each of the one or more first pre-coding matrices in the first pre-coding matrix set is obtained based upon one of the one or more phase factors in the preset phase set.

2. The method according to claim 1, wherein obtaining the first pre-coding matrix set according to one or more vector groups in the preset vector group set and according to one or more phase factors in the preset phase set comprises:

performing a Kronecker product operation on a phase matrix and one or more vectors in a vector group in the vector group set, wherein the phase matrix is obtained based upon a phase factor in the preset phase set; and constituting one of the one or more first pre-coding matrices in the first pre-coding matrix set by using column vectors in a matrix obtained as a result of the Kronecker product operation; and wherein the phase matrix is $$w_n = \begin{bmatrix} 1 & 1 \\ \varphi_n & -\varphi_n \end{bmatrix}, \text{ or } w_n = \begin{bmatrix} 1 \\ \varphi_n \end{bmatrix}, \text{ or } w_n = \begin{bmatrix} 1 \\ -\varphi_n \end{bmatrix}.$$

3. The method according to claim 1, wherein the indication information of the first pre-coding matrix set in the first sub-band comprises:

a first Pre-coding Matrix Indicator (PMI), wherein the first PMI is an index of a first vector group in the preset vector group set, and the first pre-coding matrix set is obtained based upon the first vector group; or a first PMI and a second PMI, wherein the first PMI is an index of a vector group subset in the preset vector group set, the second PMI is an index of the first vector group in the vector group subset indicated by the first PMI, and the first pre-coding matrix set is obtained based upon the first vector group.

4. The method according to claim 1, wherein the indication information of the first pre-coding matrix set in the first sub-band comprises:

a first PMI, wherein the first PMI is an index of the first pre-coding matrix set in a first codebook, and the first codebook comprises multiple first pre-coding matrix sets obtained according to the vector group set and according to the phase set; or a first PMI and a second PMI, wherein the first PMI is an index of a fourth pre-coding matrix set in a first codebook, the second PMI is an index of the first pre-coding matrix set in the fourth pre-coding matrix set, the first codebook comprises multiple first pre-coding matrix sets obtained according to the vector group set and according to the phase set, and the fourth pre-coding matrix set comprises one or more first pre-coding matrix sets, and is a subset of the first codebook.

5. The method according to claim 1, wherein the first pre-coding matrix set is obtained according to a second pre-coding matrix and according to a preset third pre-coding matrix set, wherein each of the one or more first pre-coding matrices in the first pre-coding matrix set is obtained as a result of calculation operation based on both the second pre-coding matrix and a third pre-coding matrix in the third pre-coding matrix set;

and wherein the second pre-coding matrix consists of one vector in a vector group in a preset vector group set; or, the second pre-coding matrix consists of a plurality of vectors in a vector group in the preset vector group set; or, the second pre-coding matrix consists of a vector of zeros and one or more vectors in a vector group in the preset vector group set, wherein all elements of the vector of zeros are zero.

6. The method according to claim 5, wherein indication information of the first pre-coding matrix set in the first sub-band comprises:

a first PMI, wherein the first PMI is an index of the second pre-coding matrix in a second pre-coding matrix set, and the first pre-coding matrix set is obtained based upon the second pre-coding matrix; or a first PMI and a second PMI, wherein the first PMI is an index of a second pre-coding matrix subset in the second pre-coding matrix set, the second PMI is an index of the second pre-coding matrix in the second pre-coding matrix subset indicated by the first PMI, and the first pre-coding matrix set is obtained based upon the second pre-coding matrix;

or, wherein the indication information of the first pre-coding matrix set in the first sub-band comprises:

a first PMI, wherein the first PMI is an index of the first pre-coding matrix set in a first codebook, the first codebook comprises multiple first pre-coding matrix sets obtained according to a second pre-coding matrix set and according to the third pre-coding matrix set, and each of the multiple first pre-coding matrix sets is obtained according to a second pre-coding matrix in the second pre-coding matrix set and according to the third pre-coding matrix set; or a first PMI and a second PMI, wherein the first PMI is an index of a fourth pre-coding matrix set in the first codebook, the second PMI is an index of the first pre-coding matrix set in the fourth pre-coding matrix set, the first codebook comprises multiple first pre-coding matrix sets obtained according to the second pre-coding matrix set and according to the third pre-coding matrix set, and the fourth pre-coding matrix set comprises one or more first pre-coding matrix sets, and is a subset of the first codebook.

7. The method according to claim 1, wherein determining, by the terminal, the CQI in the second sub-band according to the downlink channel information and according to the first pre-coding matrix set in the first sub-band comprises:

determining, by the terminal, one or more second pre-coding matrices corresponding to one or more physical resources in the second sub-band according to the one or more first pre-coding matrices in the first pre-coding matrix set corresponding to the one or more physical resources in the first sub-band; and determining, by the terminal, the CQI in the second sub-band according to the one or more second pre-coding matrices corresponding to the one or more physical resources in the second sub-band.

8. The method according to claim 1, after obtaining, by the terminal, the first pre-coding matrix set in the first sub-band corresponding to the number of downlink transmission layers according to the number of downlink transmission layers, comprising:

for each of the one or more first pre-coding matrices in the first pre-coding matrix set, arranging column vectors in the first pre-coding matrix according to a column vector arrangement pattern corresponding to the first pre-coding matrix, to obtain a fifth pre-coding matrix set in the first sub-band;

wherein determining, by the terminal, the CQI in the second sub-band comprises:

determining the CQI in the second sub-band according to the downlink channel information and according to the fifth pre-coding matrix set in the first sub-band.

9. A pre-coding method, comprising:

receiving, by a base station, feedback of Channel State Information (CSI) provided by a terminal, wherein the CSI comprises indication information of a first pre-coding matrix set in a first sub-band;

determining, by the base station, the first pre-coding matrix set in the first sub-band according to the indication information, wherein the first pre-coding matrix set comprises one or more first pre-coding matrices, and each physical resource in the first sub-band corresponds to a first pre-coding matrix in the first pre-coding matrix set; and pre-coding, by the base station, data to be transmitted over a physical resource in the first sub-band using the first pre-coding matrix corresponding to the physical resource according to the first pre-coding matrix set;

wherein determining, by the base station, the first pre-coding matrix set in the first sub-band according to the indication information comprises:

determining, by the base station, an index of a first vector group in a preset vector group set according to the indication information; and obtaining, by the base station, the first pre-coding matrix set in the first sub-band according to the first vector group and according to one or more phase factors in a phase set.

10. The method according to claim 9, wherein the indication information of the first pre-coding matrix set in the first sub-band comprises:

a first Pre-coding Matrix Indicator (PMI), wherein the first PMI is an index of the first vector group in the preset vector group set, and the first pre-coding matrix set is obtained based upon the first vector group; or a first PMI and a second PMI, wherein the first PMI is an index of a vector group subset in the preset vector group set, the second PMI is an index of the first vector group in the vector group subset indicated by the first PMI, and the first pre-coding matrix set is obtained based upon the first vector group.

11. The method according to claim 9, wherein the indication information of the first pre-coding matrix set in the first sub-band comprises a first PMI, wherein the first PMI is an index of the first pre-coding matrix set in a first codebook, and the first codebook comprises multiple first pre-coding matrix sets obtained according to a preset vector group set and according to a preset phase set, and the base station determines the first pre-coding matrix set in the first sub-band according to the first PMI;

or the indication information of the first pre-coding matrix set in the first sub-band comprises a first PMI and a second PMI, wherein the first PMI is an index of a fourth pre-coding matrix set in the first codebook, the second PMI is an index of the first pre-coding matrix set in the fourth pre-coding matrix set, the first codebook comprises multiple first pre-coding matrix sets obtained according to the preset vector group set and according to the preset phase set, and the fourth pre-coding matrix set comprises one or more first pre-coding matrix sets, and is a subset of the first codebook, and the base station determines the first pre-coding matrix set in the first sub-band according to the first PMI and according to the second PMI.

12. The method according to claim 9, wherein determining, by the base station, the first pre-coding matrix set in the first sub-band according to the indication information comprises:

determining, by the base station, an index of a second pre-coding matrix in a second pre-coding matrix set according to the indication information; and obtaining, by the base station, the first pre-coding matrix set in the first sub-band according to the second pre-coding matrix and according to a preset third pre-coding matrix set, wherein each first pre-coding matrix in the first pre-coding matrix set is obtained as a result of calculation operation based on both the second pre-coding matrix and a third pre-coding matrix in the third pre-coding matrix set.

13. The method according to claim 12, wherein the indication information of the first pre-coding matrix set in the first sub-band comprises:

a first PMI, wherein the first PMI is an index of the second pre-coding matrix in a second pre-coding matrix set, and the first pre-coding matrix set is obtained based upon the second pre-coding matrix; or a first PMI and a second PMI, wherein the first PMI is an index of a second pre-coding matrix subset in a second pre-coding matrix set, the second PMI is an index of the second pre-coding matrix in the second pre-coding matrix subset indicated by the first PMI, and the first pre-coding matrix set is obtained based upon the second pre-coding matrix.

14. The method according to claim 9, wherein the indication information of the first pre-coding matrix set in the first sub-band comprises a first PMI, the first PMI is an index of the first pre-coding matrix set in a first codebook, the first codebook comprises multiple first pre-coding matrix sets obtained according to a second pre-coding matrix set and according to a third pre-coding matrix set, the first pre-coding matrix set is obtained based on each second pre-coding matrix in the second pre-coding matrix set and based on the third pre-coding matrix set, and the base station determines the first pre-coding matrix set in the first sub-band according to the first PMI;

or the indication information of the first pre-coding matrix set in the first sub-band comprises a first PMI and a second PMI, wherein the first PMI is an index of a fourth pre-coding matrix set in the first codebook, the second PMI is an index of the first pre-coding matrix set in the fourth pre-coding matrix set, the first codebook comprises multiple first pre-coding matrix sets obtained according to a second pre-coding matrix set and according to a third pre-coding matrix set, and the fourth pre-coding matrix set comprises one or more first pre-coding matrix sets, and is a subset of the first codebook, and the base station determines the first pre-coding matrix set in the first sub-band according to the first PMI and according to the second PMI.

15. A terminal, comprising:
a memory storing instructions; and
a processor configured to execute the instructions to:
obtain a first pre-coding matrix set in a first sub-band corresponding to the number of downlink transmission layers according to the number of downlink transmission layers, wherein the first pre-coding matrix set comprises one or more first pre-coding matrices and each physical resource in the first sub-band corresponds to one of the one or more first pre-coding matrices in the first pre-coding matrix set;
determine a Channel Quality Indicator (CQI) in a second sub-band according to downlink channel information and according to the first pre-coding matrix set in the first sub-band; and
provide feedback of the CSI, wherein the CSI comprises one or more of: an rank indicator (RI) indicating the number of downlink transmission layers, indication information of the first pre-coding matrix set in the first sub-band, and the CQI in the second sub-band;
wherein the first pre-coding matrix set is obtained according to one or more vector groups in a preset vector group set, and according to one or more phase factors in a preset phase set;
wherein the vector group set comprises one or more vector groups, and one first pre-coding matrix set is obtained based upon one of the one or more vector groups in the preset vector group set and/or, the preset phase set comprises one or more phase factors, and each of the one or more first pre-coding matrices in the first pre-coding matrix set is obtained based upon one of the one or more phase factors in the preset phase set.

16. The terminal according to claim 15,
wherein the indication information of the first pre-coding matrix set in the first sub-band comprises:
a first Pre-coding Matrix Indicator (PMI), wherein the first PMI is an index of a first vector group in the preset vector group set, and the first pre-coding matrix set is obtained based upon the first vector group; or
a first PMI and a second PMI, wherein the first PMI is an index of a vector group subset in the preset vector group set, the second PMI is an index of the first vector group in the vector group subset indicated by the first PMI, and the first pre-coding matrix set is obtained based upon the first vector group.

17. The terminal according to claim 16, wherein the indication information of the first pre-coding matrix set in the first sub-band comprises:
a first PMI, wherein the first PMI is an index of the first pre-coding matrix set in a first codebook, and the first codebook comprises multiple first pre-coding matrix sets obtained according to the vector group set and according to the phase set; or
a first PMI and a second PMI, wherein the first PMI is an index of a fourth pre-coding matrix set in a first codebook, the second PMI is an index of the first pre-coding matrix set in the fourth pre-coding matrix set, the first codebook comprises multiple first pre-coding matrix sets obtained according to the vector group set and according to the phase set, and the fourth pre-coding matrix set comprises one or more first pre-coding matrix sets, and is a subset of the first codebook.

18. The terminal according to claim 15, wherein the first pre-coding matrix set is obtained according to a second pre-coding matrix and according to a preset third pre-coding matrix set, wherein each of the one or more first pre-coding matrices in the first pre-coding matrix set is obtained as a result of calculation operation based on both the second pre-coding matrix and a third pre-coding matrix in the third pre-coding matrix set;
and
wherein the indication information of the first pre-coding matrix set in the first sub-band comprises:
a first PMI, wherein the first PMI is an index of the second pre-coding matrix in a second pre-coding matrix set, and the first pre-coding matrix set is obtained based upon the second pre-coding matrix; or
a first PMI and a second PMI, wherein the first PMI is an index of a second pre-coding matrix subset in the second pre-coding matrix set, the second PMI is an index of the second pre-coding matrix in the second pre-coding matrix subset indicated by the first PMI, and the first pre-coding matrix set is obtained based upon the second pre-coding matrix.

19. The terminal according to claim 18, wherein the indication information of the first pre-coding matrix set in the first sub-band comprises:
a first PMI, wherein the first PMI is an index of the first pre-coding matrix set in a first codebook, the first codebook comprises multiple first pre-coding matrix sets obtained according to a second pre-coding matrix set and according to the third pre-coding matrix set, and each of the multiple first pre-coding matrix sets is obtained according to a second pre-coding matrix in the second pre-coding matrix set and according to the third pre-coding matrix set; or
a first PMI and a second PMI, wherein the first PMI is an index of a fourth pre-coding matrix set in the first codebook, the second PMI is an index of the first pre-coding matrix set in the fourth pre-coding matrix set, the first codebook comprises multiple first pre-coding matrix sets obtained according to the second pre-coding matrix set and according to the third pre-coding matrix set, and the fourth pre-coding matrix set comprises one or more first pre-coding matrix sets, and is a subset of the first codebook.

20. The terminal according to claim 15, wherein the processor is further configured to execute the instructions to:
determine one or more second pre-coding matrices corresponding to one or more physical resources in the second sub-band according to the one or more first pre-coding matrices in the first pre-coding matrix set corresponding to the one or more physical resources in the first sub-band; and
determine the CQI in the second sub-band according to the one or more second pre-coding matrices corresponding to the one or more physical resources in the second sub-band.

* * * * *